United States Patent [19]

Schmeisser et al.

[11] Patent Number: 5,122,030
[45] Date of Patent: Jun. 16, 1992

[54] METHOD AND APPARATUS FOR TRANSPORTING CAN BLANKS AND THE LIKE

[76] Inventors: Heinz Schmeisser, 3437 S. Crandon Pl., Greenfield, Wis. 53219; Jack Ryan, 3808 Constitution Dr., Middleton, Wis. 53562

[21] Appl. No.: 598,791
[22] Filed: Oct. 17, 1990

Related U.S. Application Data

[63] Continuation of Ser. No. 243,971, Sep. 13, 1988, abandoned.

[51] Int. Cl.⁵ .............................................. B65G 57/00
[52] U.S. Cl. ................................ 414/790.2; 414/794.4; 414/790.4; 414/923; 414/789.1; 198/418.3; 901/47
[58] Field of Search ............ 413/70; 414/790.2, 790.4, 414/790.9, 789.1, 794.4, 923, 792.9; 198/418.2, 418.3, 418.9, 462

[56] References Cited

U.S. PATENT DOCUMENTS

| | | | |
|---|---|---|---|
| 1,490,235 | 4/1924 | Smith | 414/791.9 |
| 2,556,214 | 6/1951 | Pottle . | |
| 3,027,021 | 3/1962 | Kramer | 414/795.8 |
| 3,088,604 | 5/1963 | Nilsson | 414/790.4 |
| 3,343,691 | 9/1967 | Anderson . | |
| 3,587,688 | 6/1971 | Toby . | |
| 3,683,758 | 8/1952 | Feldkamper . | |
| 3,690,650 | 9/1972 | Maier, Jr. et al. . | |
| 3,717,075 | 2/1973 | Lopez . | |
| 3,717,538 | 2/1973 | Hartung . | |
| 3,724,640 | 4/1973 | Rapparlie . | |
| 3,752,043 | 8/1973 | Rapparlie et al. . | |
| 3,762,579 | 10/1973 | Schade | 414/790.4 |
| 3,777,903 | 12/1973 | Kuckhermann . | |
| 3,836,018 | 9/1974 | Dawson et al. . | |
| 3,880,059 | 4/1975 | Brockmueller . | |
| 3,915,316 | 10/1975 | Pomara, Jr. . | |
| 4,014,230 | 3/1977 | Eisele . | |
| 4,030,619 | 6/1977 | Hiscoe . | |
| 4,108,031 | 8/1978 | Dangelmaier et al. . | |
| 4,119,211 | 10/1978 | Boyer et al. . | |
| 4,203,334 | 5/1980 | Zettler . | |
| 4,242,024 | 12/1980 | Buta et al. . | |
| 4,324,522 | 4/1982 | Buccicone . | |
| 4,364,702 | 12/1982 | Coussot . | |
| 4,367,997 | 1/1983 | Schweingruber . | |
| 4,443,147 | 4/1984 | Richards . | |
| 4,451,191 | 5/1984 | Torre . | |
| 4,457,662 | 7/1984 | Ireland et al. . | |
| 4,523,502 | 6/1985 | Besemann . | |
| 4,541,763 | 9/1985 | Chandhoke | 414/790.2 |
| 4,635,786 | 1/1987 | Renda | 198/418.6 |
| 4,746,004 | 5/1988 | Hess et al. . | |

Primary Examiner—James G. Smith
Assistant Examiner—Jack Lavinder
Attorney, Agent, or Firm—Hill, Van Santen, Steadman & Simpson

[57] ABSTRACT

An apparatus and method for transferring can blanks from a steel slitting machine to a welder includes a two stage chain conveyor feeding stacker pockets on a dial indexer or turntable for holding a predetermined number of stacks. A gripper assembly mounted at the end of a vertical drive assembly on a horizontally movable carriage moves along a horizontal overhead beam to transfer stacked blanks from the turntable into the welder hopper.

8 Claims, 21 Drawing Sheets

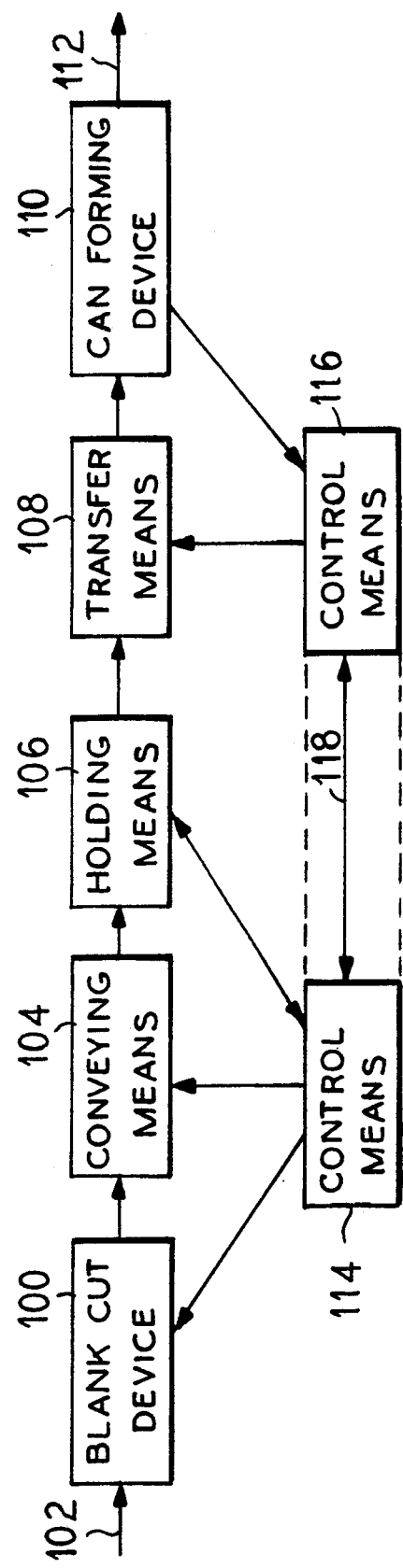

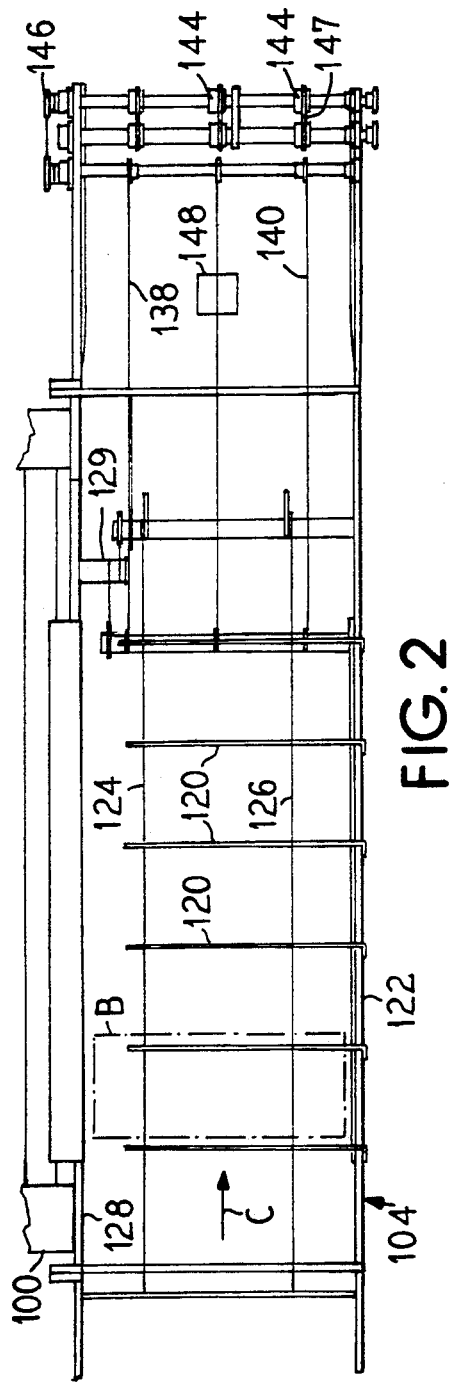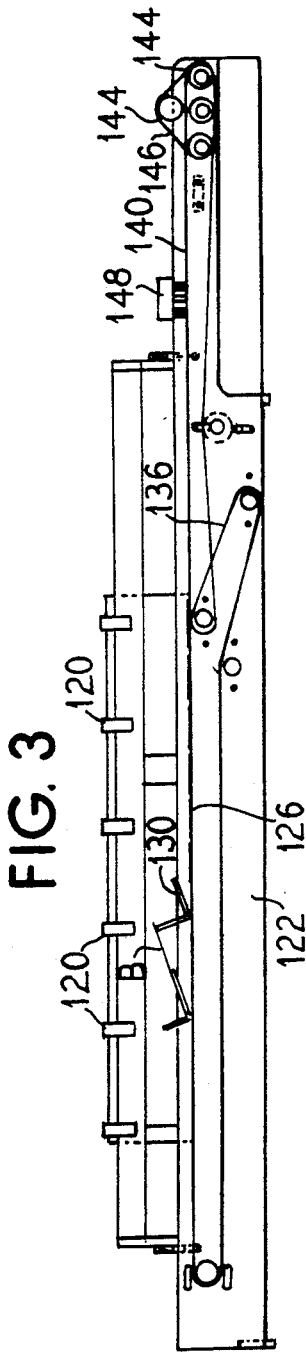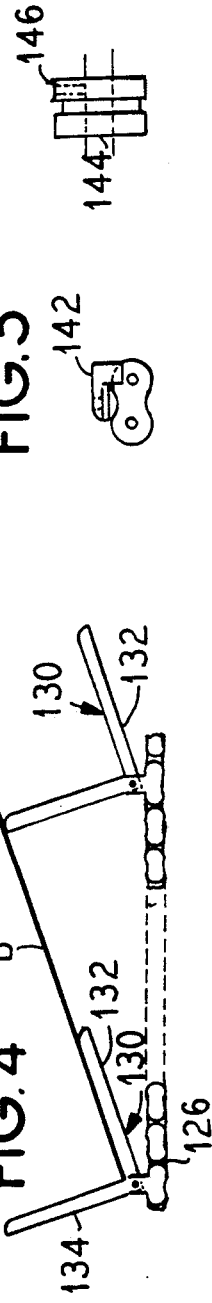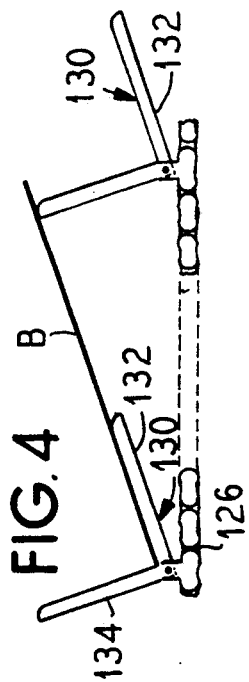

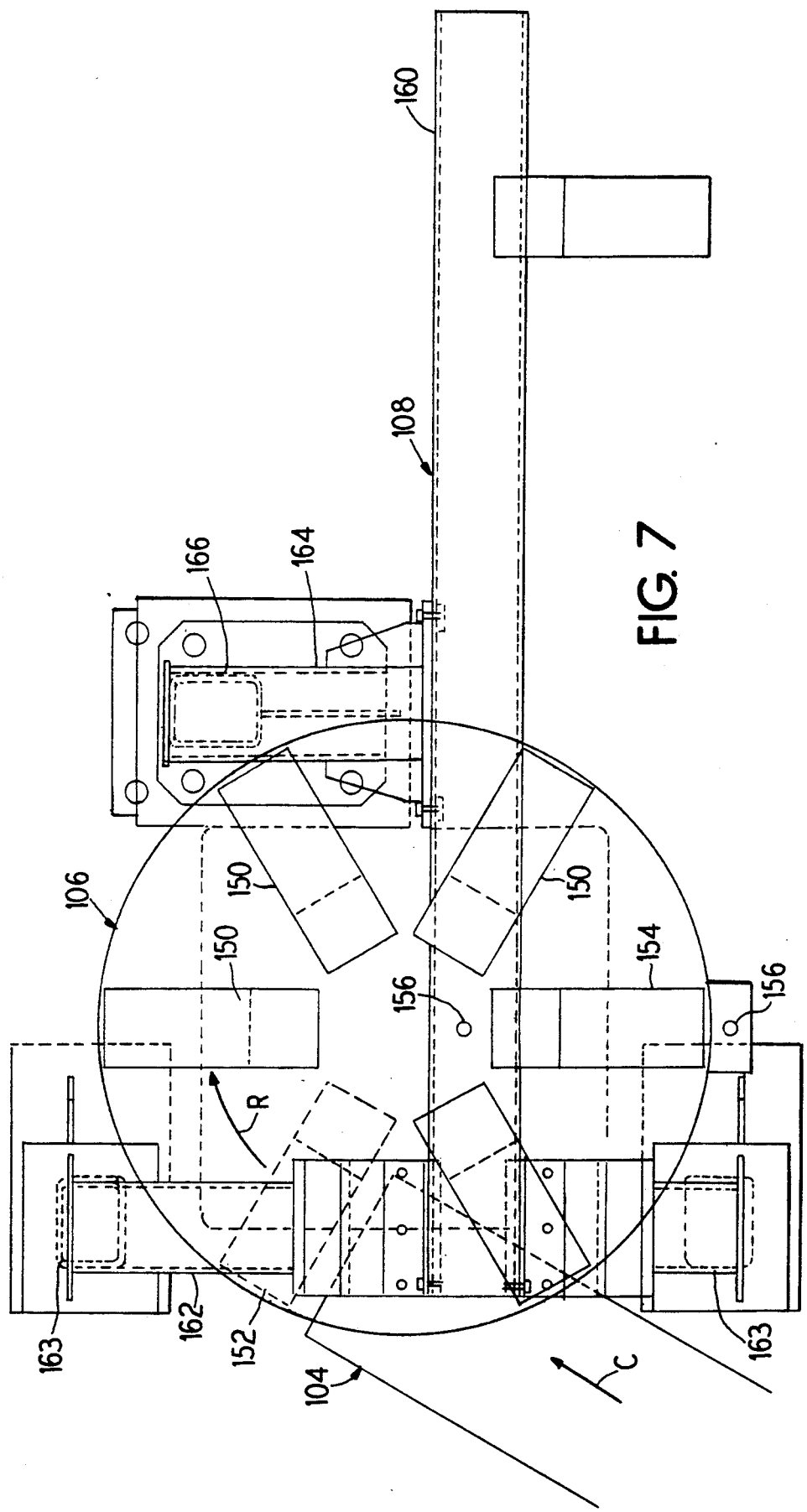

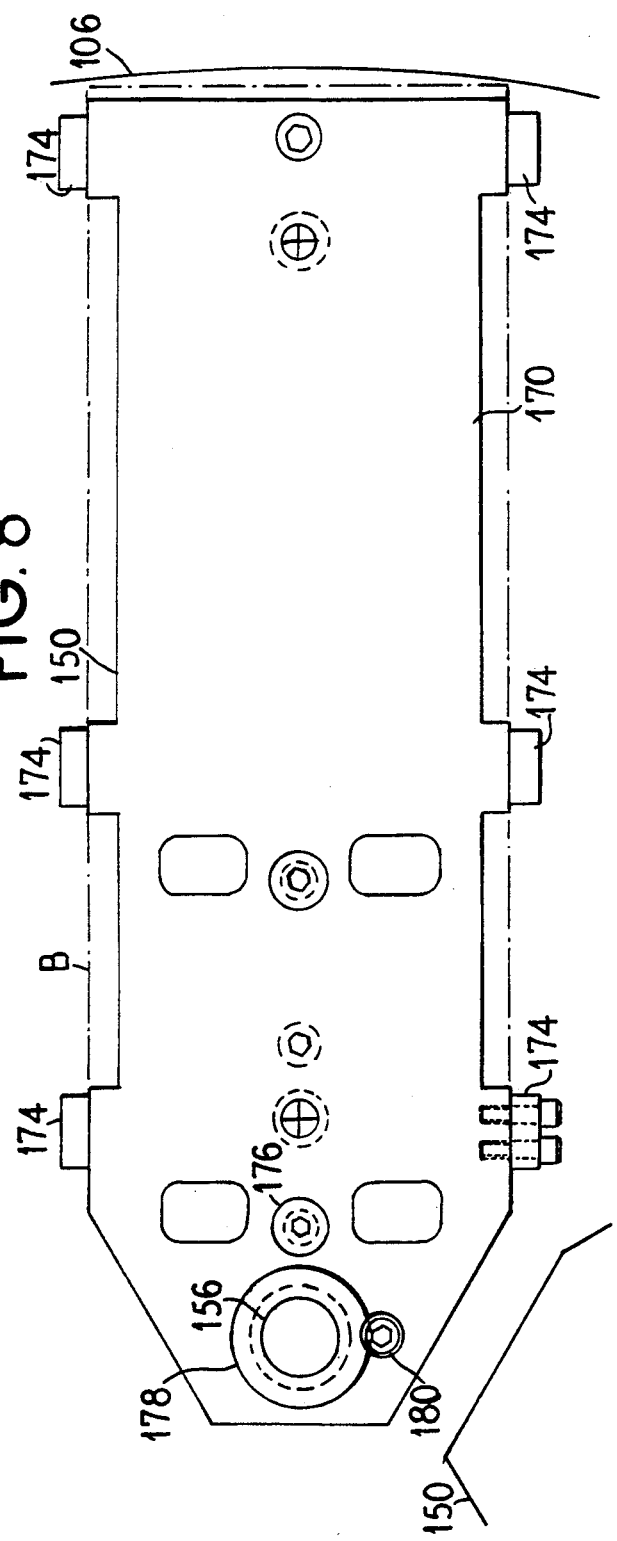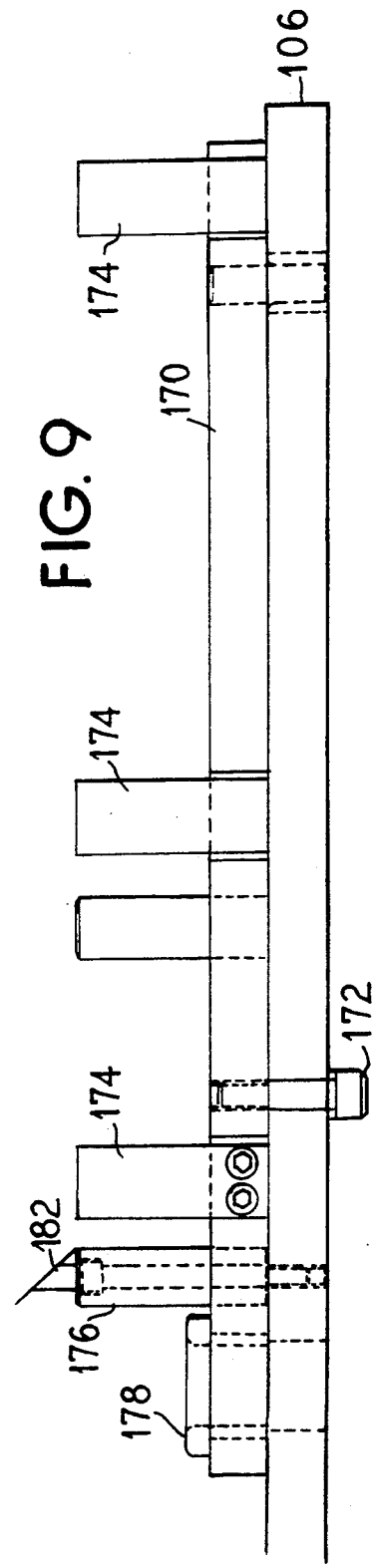

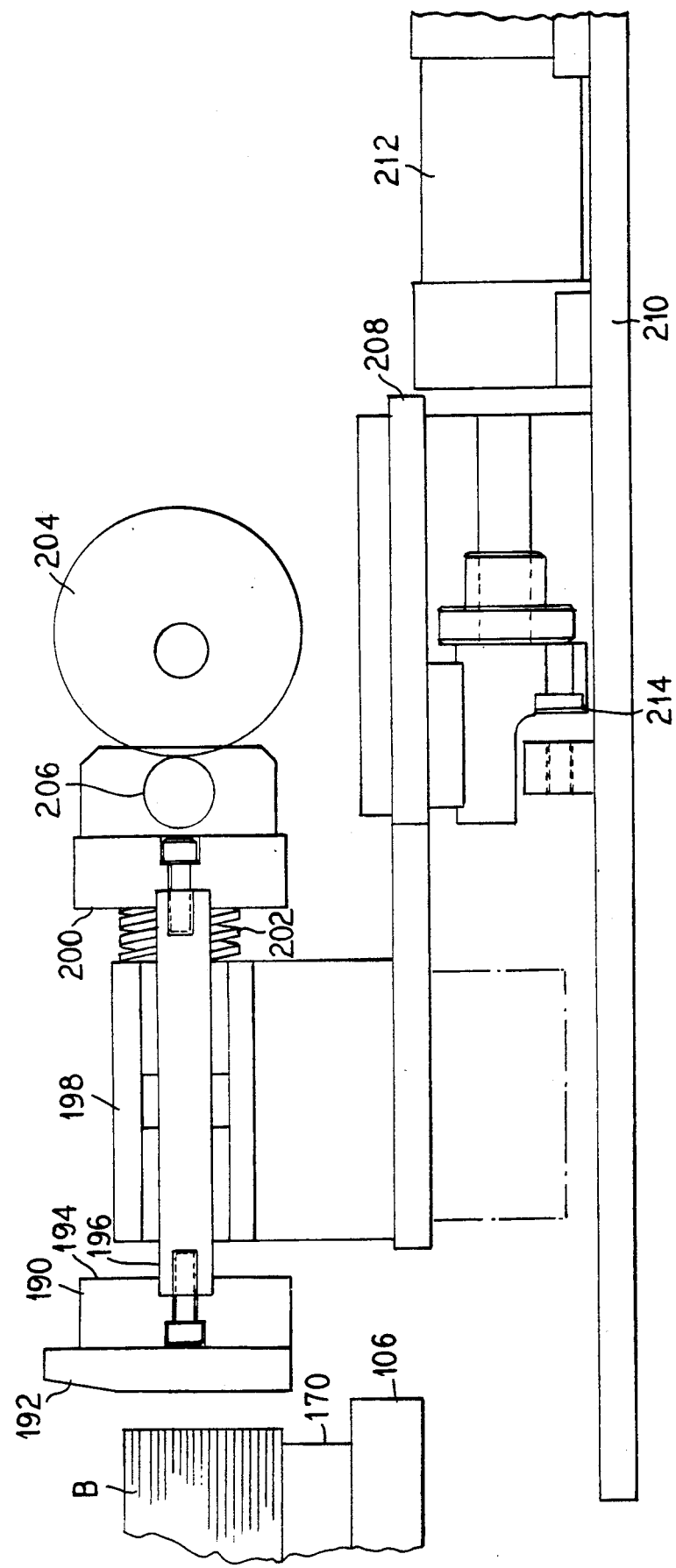

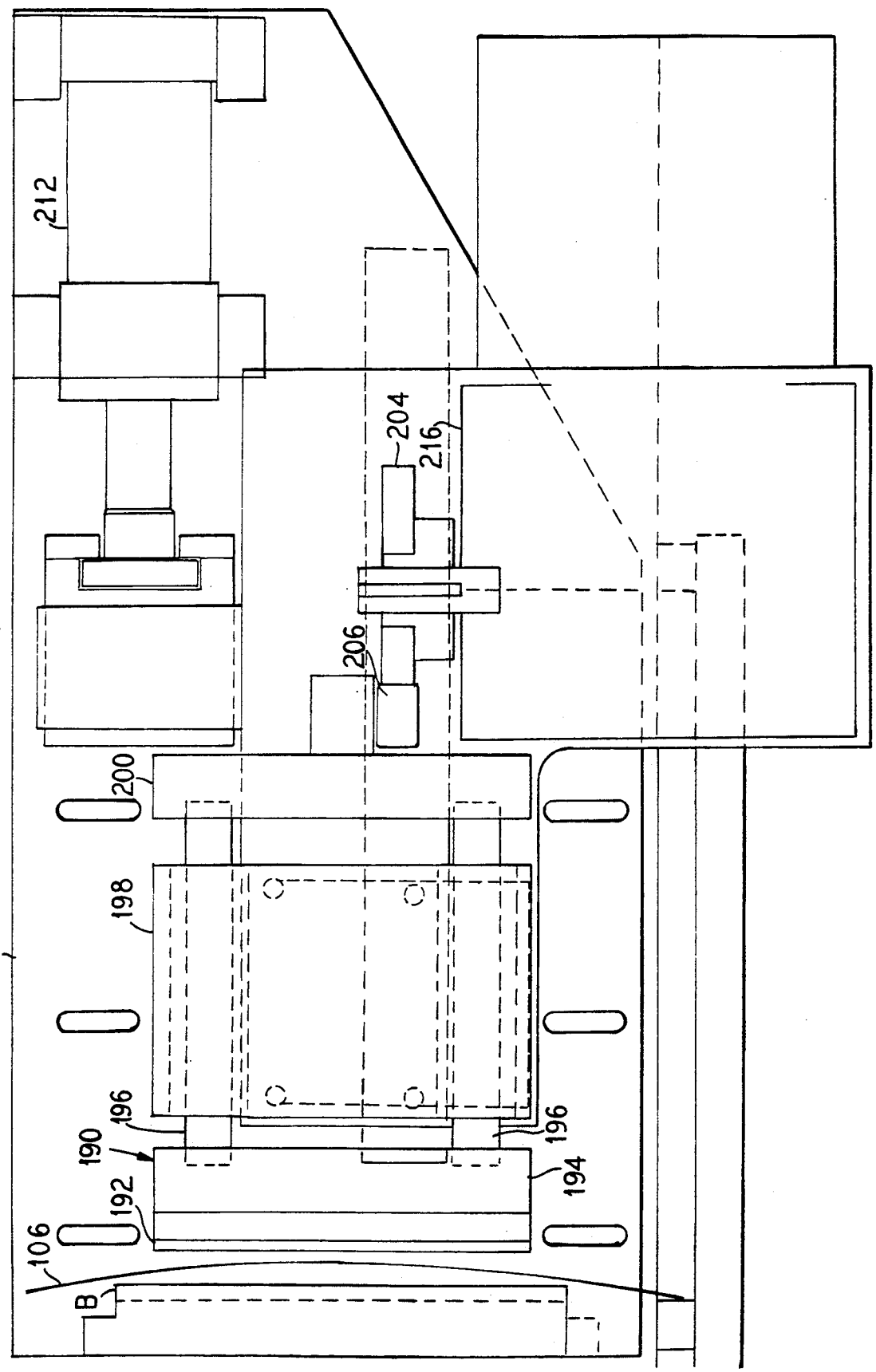

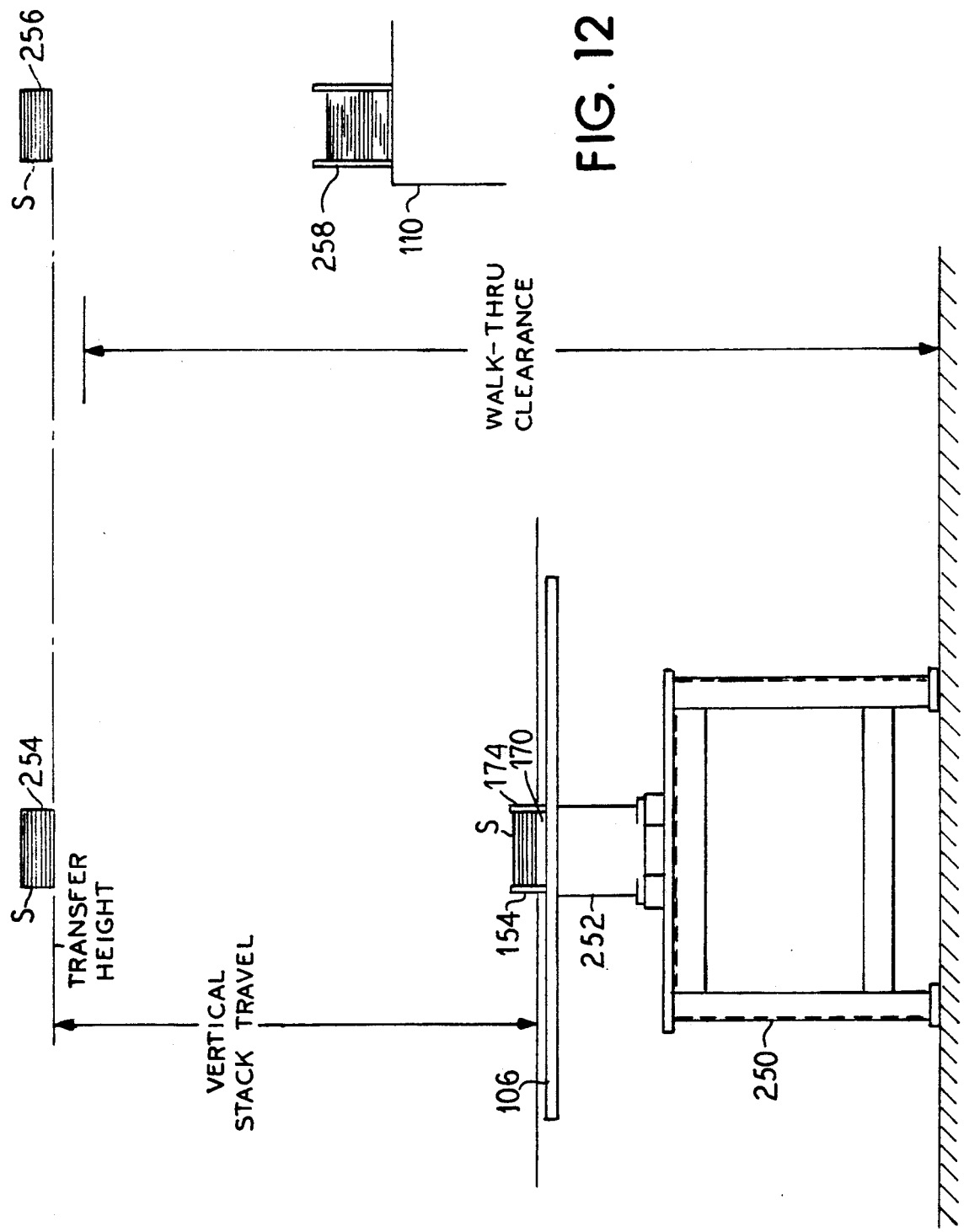

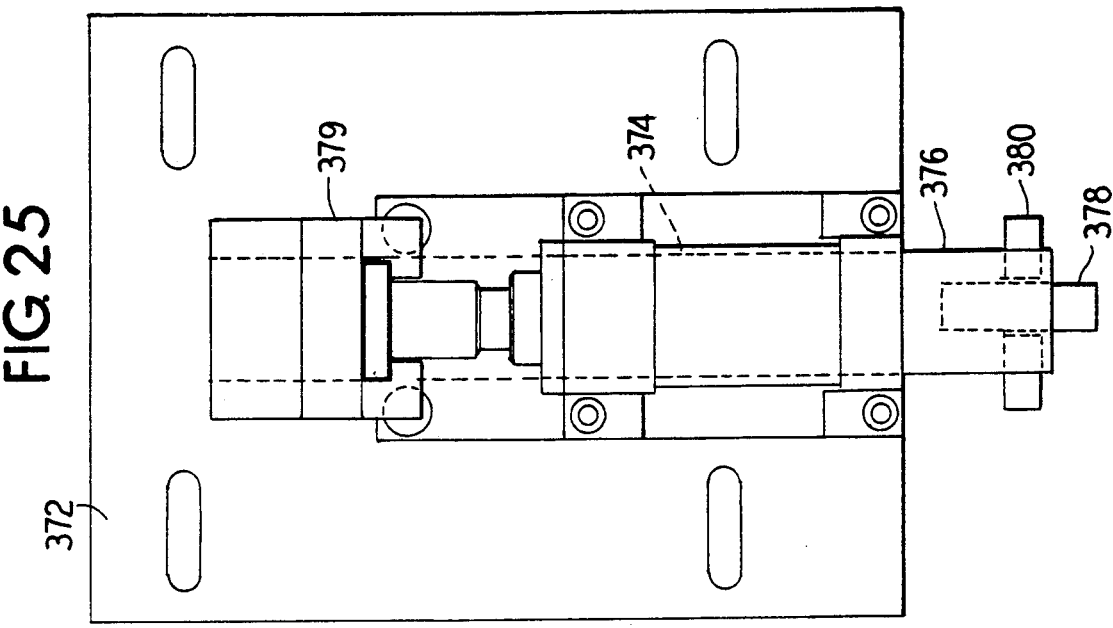
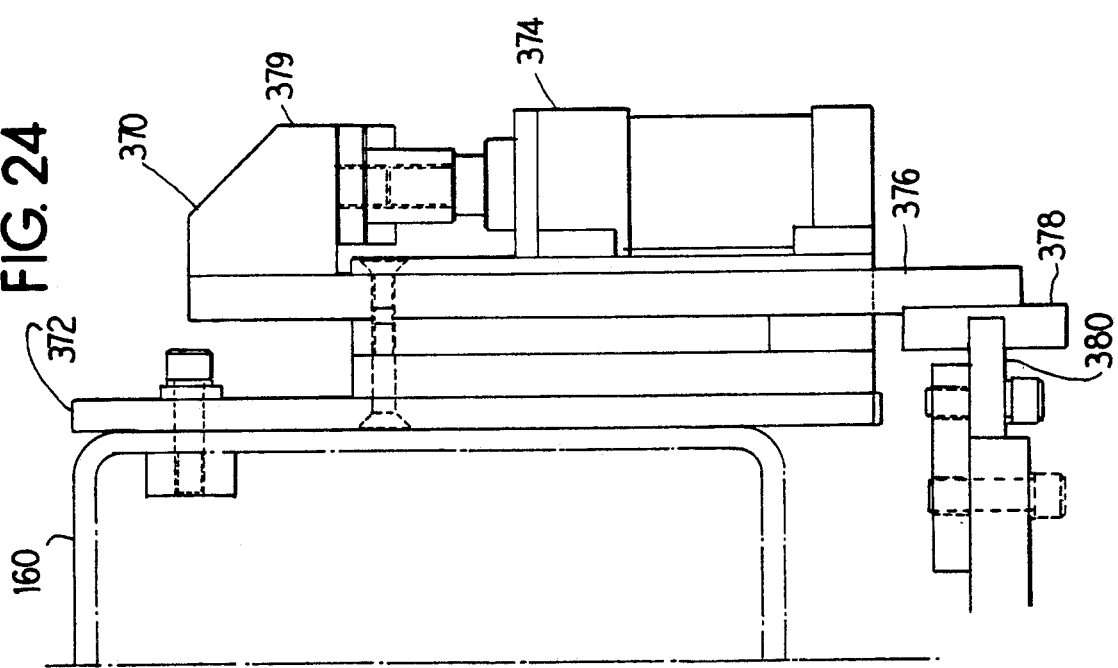

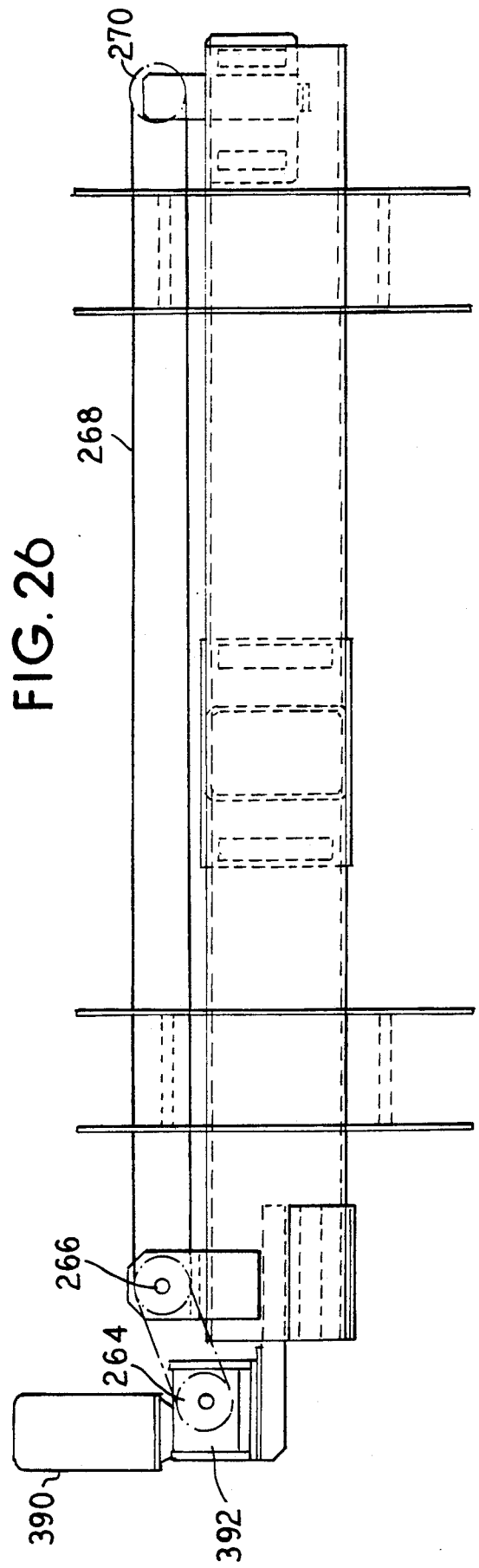

METHOD AND APPARATUS FOR TRANSPORTING CAN BLANKS AND THE LIKE

This is a continuation of application Ser. No. 243,971 filed Sep. 13, 1988 abandoned.

BACKGROUND OF THE INVENTION

1. Field of the Invention

The present invention relates generally to a method and apparatus for receiving stock, stacking a plurality of the stock in aligned stacks, and transporting the aligned stacks to a receptacle.

2. Description of the Related Art

U.S. Pat. No. 3,836,018 discloses an article palletizing and depalletizing apparatus including a first embodiment with a suction head mounted on an elevated track for horizontal travel between a conveyor and a pallet. A second embodiment has a first end of an elevated track over one of six pallet receiving tables on a rotatable carousel carriage. A suction head is raised and lowered to grip an entire layer of articles only by their top surface.

U.S. Pat. No. 3,690,650 discloses a method and apparatus for feeding sheet material, such as signatures or magazine portions, into a hopper as even stacks. The signatures are carried, overlapped, on a conveyor operated intermittedly as controlled by sensors in the hopper. The hopper uses air jets of compressed air directed against the signatures as well as reciprocating motion of joggers as the signatures fall into the hopper. The joggers reciprocate out of phase with one another to even the stack.

A transporting device in the form of a turret stacker is disclosed in U.S. Pat. No. 4,443,147 including a turret rotatable by 180 degrees for placing coils in a stack on a turntable. The turret has a lifting and stacking mechanism on which is supported pivotally movable legs including rests for gripping and supporting the coils.

U.S. Pat. No. 4,451,191 discloses a device for removing stacked materials from a carousel which includes a pickup member supported by a pair of spaced horizontal rods which are mounted on a vertically extending rod. The pickup member lifts individual pieces of fabric from a stack at one of four locations on the carousel.

U.S. Pat. No. 4,242,024 includes a fork-lift mechanism for palletizing metal sheets from a sheering press wherein the fork lift mechanism is supported on a carriage mounted on an elevated track for horizontal and vertical displacement. A conveyor moves in a direction traverse to the direction of the discharge of the sheering press. Flipper assemblies and side tamper assemblies are included along with an end stop to aid in stacking of the sheet material on the fork lift.

U.S. Pat. No. 2,556,214 discloses an apparatus for stacking and packing can ends into a fiber tube. The can ends are fed continuously into the device and fall into place along guide bars after being cut. The can ends are moved horizontally during a feed stroke to stacker worms which rotate to lift can ends into the open bottom of a fiber tube. Once 125 can ends are in the tube, a sample is discharged for inspection and a turret on which the tube is mounted is rotated to the next position for filling of the next tube. The tubes are then manually closed and taped at the ends thereof.

SUMMARY OF THE INVENTION

An object of the present invention is to automatically stack, transport and align blank stock and the like for placement into a hopper.

Another object of the invention is to provide interactive control of a blank cutting device by a blank transporting device.

A further object of the invention is to provide an automatic function specific blank transporting apparatus adaptable to different manufacturing situations without site modification.

Yet another object of the invention is to provide a space saving blank transfer apparatus providing walk through clearance between a blank cutting device and a blank forming device.

These are other objects of the invention are achieved in a method and apparatus for receiving cut blanks from a blank cutting device, such as in parallel, and conveying the cut blanks, preferably serially, into a stack receiving portion operable to form aligned stacks of the blanks. Once in the stack receiving portion, the aligned stacks are transported to and accurately positioned in a hopper for a blank processing device. The stacks are transported to the hopper only when needed and the stack receiving portion includes means for holding up to a predetermined number of stacks awaiting transportation to the hopper.

Various advantages and improvements are realized when the apparatus includes means for receiving the cut blanks from the blank cutting device in side-by-side relation and for positioning the blanks in somewhat overlapped fashion for serial conveying to the stack receiving means. Accelerator rolls are provided for accelerate each blank in the serial procession into the stack receiving means. As each blank is accelerated and preferably thrown into the stack receiving means, a combination of beveled surfaces and a reciprocating, or oscillating, member to operate to assure proper alignment of each blank onto a stack of the blanks.

Once a predetermined quantity of the blanks has been stacked, the stack receiving means, which is preferably one of a plurality of positions on a turntable or the like, is moved to another stack receiving position and the just-formed stack is thereby moved to a holding position. When a plurality of such stack receiving positions is provided on a turntable, the rotation of the turntable sequentially moves each stack receiving position into alignment with a feed end of the conveyor to thereby receive a stack of the blanks.

As the turntable is rotated, the stack receiving positions are likewise moved sequentially into a transport position. When a stack of the blanks is needed by, for example, a can forming and welding device, a gripper is lowered onto the stack in the transport position and the stack is gripped and lifted therefrom. Thereafter, the stack is carried through a combination of vertical and horizontal movements and subsequently placed into a hopper of the can forming and welding device, preferably on top of and in accurate alignment with previously transported can blanks. The gripper then releases the just-transported stack into the hopper and returns for transportation of a subsequent stack.

Preferably, an assortment of sensors as well as controllers, such as programmed logic controllers, automatically operate the apparatus of the present invention to accurately position the stacks in the can forming device hopper and to ensure that no more than a predetermined quantity and no less then a smaller predetermined quantity of can blanks is maintained in the hopper. The controllers are also preferably connected to control the blank cutting device.

Thus, there is provided an automatic apparatus and a method for its operation for economically and accurately controlling and interactively connecting two devices operable in a can making process.

BRIEF DESCRIPTIONS OF THE DRAWINGS

FIG. 1 is a functional block diagram of an invention according to the principles of the present invention;

FIG. 2 is a plan view of a conveyor portion of the present invention for receiving cut blanks from a blank cutting device;

FIG. 3 is a side elevational view of the conveyor of FIG. 2;

FIG. 4 is an elevational view of conveyor bracket elements forming part of a conveyor of FIGS. 2 and 3;

FIG. 5 is an enlarged elevational view of a finger link element from a second conveyor portion of the conveyor shown in FIGS. 2 and 3;

FIG. 6 is an end view of an accelerator roller from the conveyor of FIGS. 2 and 3;

FIG. 7 is a plan view of a turntable of a holding means below a gantry forming part of a transfer means shown relative to an output end of the conveyor according to the present invention;

FIG. 8 is a plan view of a turntable fixture for mounting on the turntable of FIG. 7;

FIG. 9 is a side elevational view of the turntable fixture of FIG. 8 shown mounted on the turntable;

FIG. 10 is a an end view of the turntable fixture of FIG. 8;

FIG. 11a is a side elevational view of an oscillator assembly for aligning stacked blanks according to the present invention;

FIG. 11b is a plan view of the oscillator assembly of FIG. 11a;

FIG. 12 is a schematic diagram showing the relationship of transfer positions to the turntable of the holding means;

Figure 27:
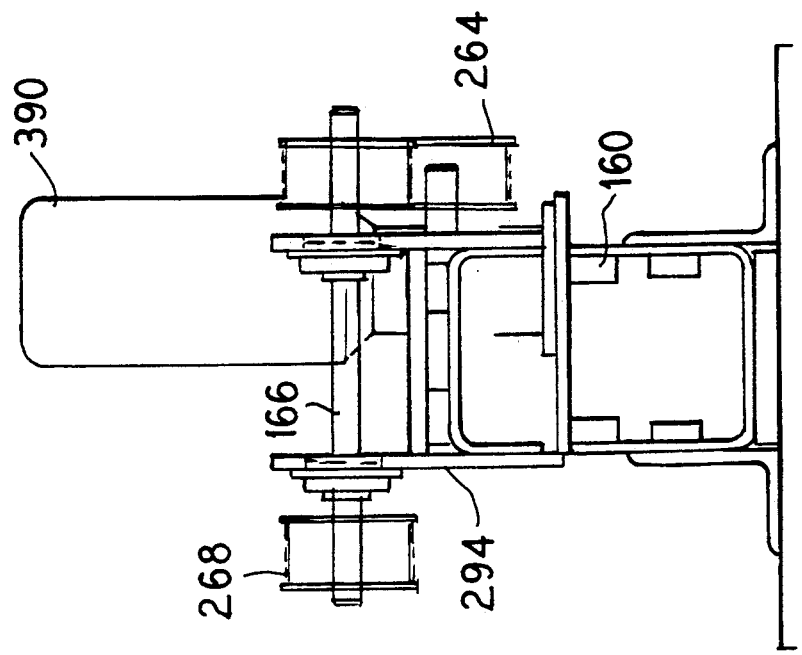
Figure 28:
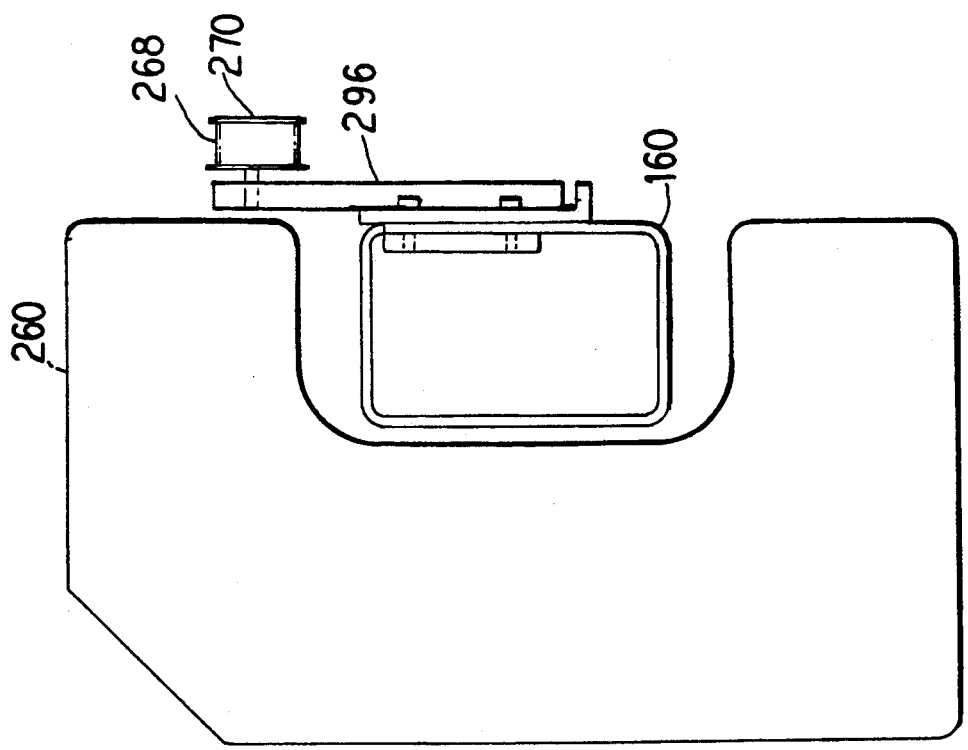
Figure 29:
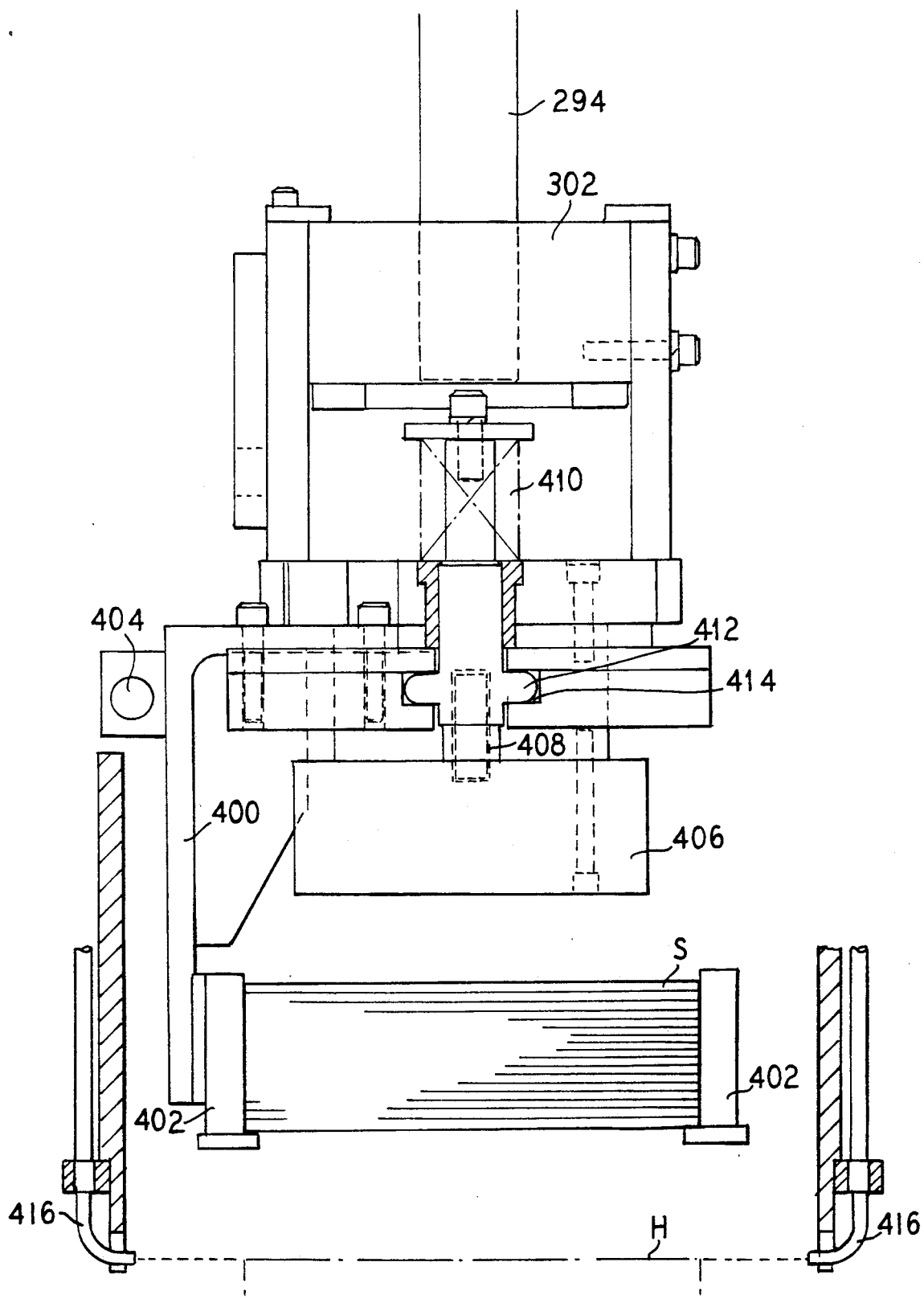
Figure 30:
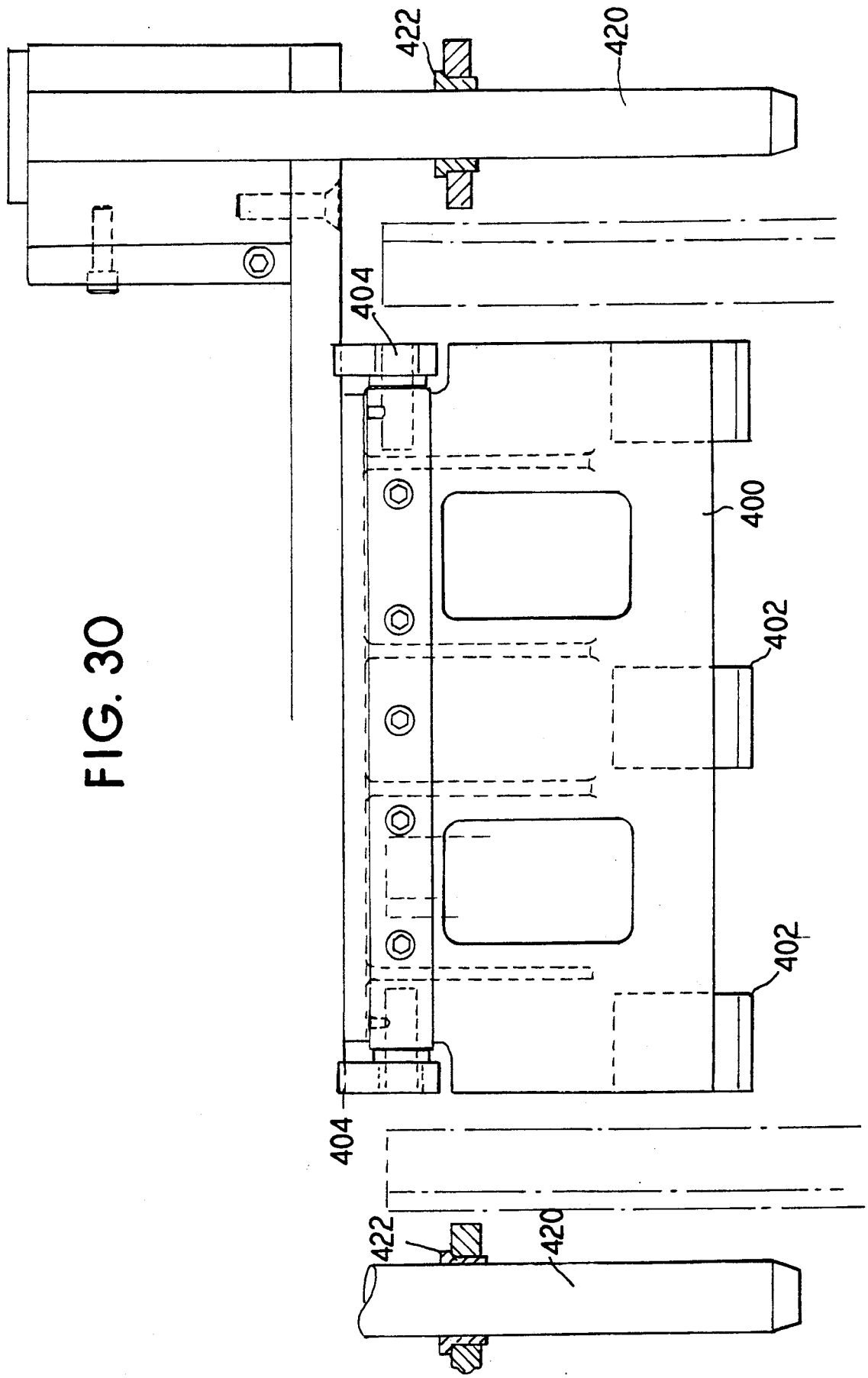

FIG. 24 an end elevational view of a shot pin assembly for positioning the carriage assembly at a predetermined location along the gantry;

FIG. 25 is a side elevational view of the shot pin assembly of FIG. 24;

FIG. 26 is a side elevational view of a second embodiment of a horizontal drive system for the gantry according to the present invention;

FIG. 27 is an end elevational view of the second embodiment of the horizontal drive as shown in FIG. 26;

FIG. 28 is an end elevational view of a pulley bracket mounted on a transverse beam of the gantry of the transport means of the invention;

FIG. 29 is an end elevational view of a gripper assembly for mounting on the end of the vertical drive assembly according to the present invention;

FIG. 30 is a side elevational view of the gripper assembly of FIG. 29; and

Figure 31:
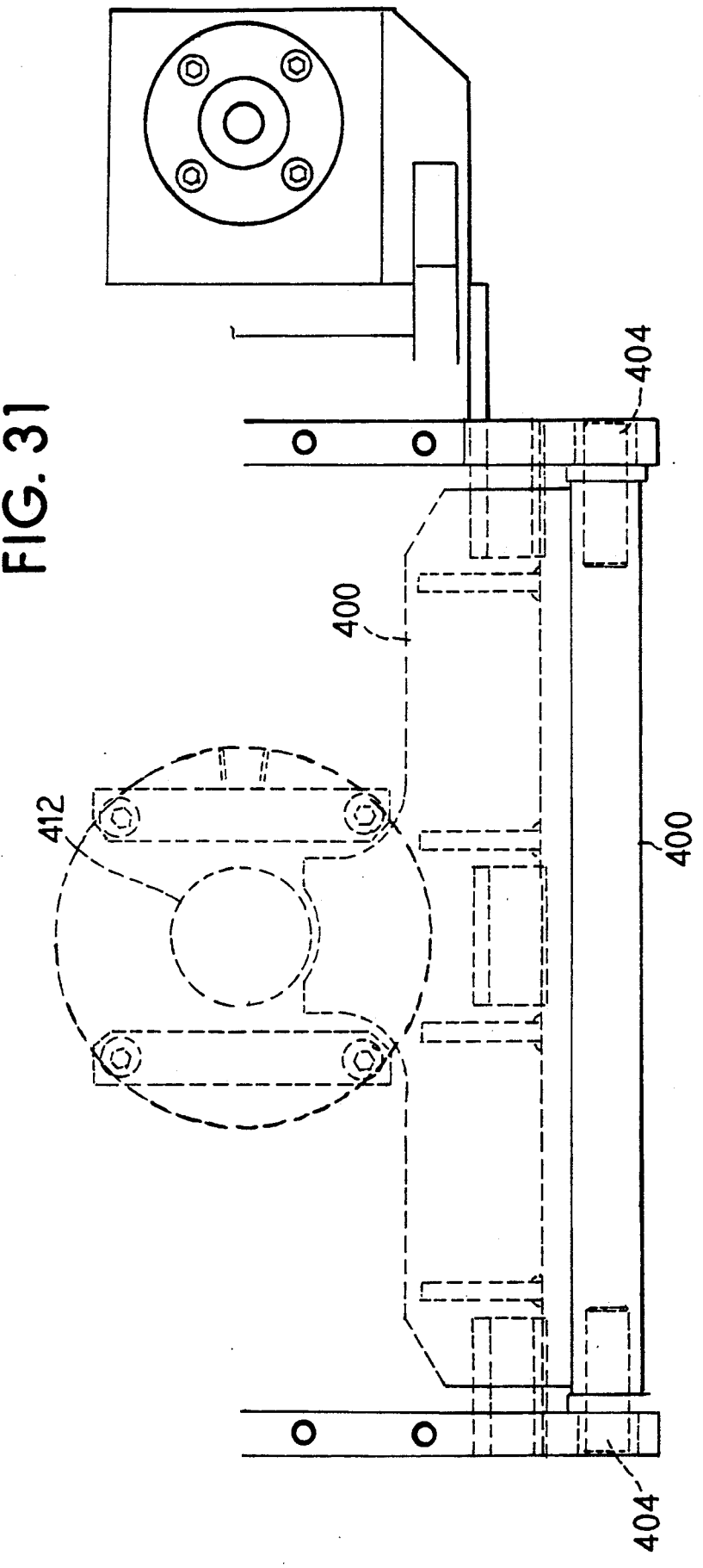

FIG. 31 is a plan view of the gripper assembly of FIG. 29.

DESCRIPTION OF THE PREFERRED EMBODIMENTS

In FIG. 1 is shown a functional block diagram of an apparatus according to the principles of the present invention. In particular, a known blank cutting device 100 which is, for example, a slitting machine as an input 102 at which rolled sheet steel, for example, is fed. After the rolled sheet steel is cut into blanks by the blank cutting device 100, it is received by a conveying means 104 of the present invention. The conveying means 104 conveys the blanks to a holding means 106 where the blanks are stored temporarily until needed. The holding means may have a plurality of blank storage locations. When needed, a transfer means 108 transfers the blanks to a known can forming device 110 having an output 112 at which at least partially formed cans are output. The can forming device 110, for example, is a can shaping and seam welding machine having a hopper at its input.

Preferably, the holding means 106, in addition to storing the blanks also stacks and aligns them for transfer by the transfer means 108 and for use in the can forming device 110. This is significant since the known can forming devices generally require an accurately positioned and aligned stack of blanks at an inlet hopper thereof to avoid misfeeding and jamming.

The present device automatically controls the flow of blanks between the blank cutting device 100 and the can forming device 110 and, in one embodiment, has two control means 114 and 116. The first control means 114 receives information from the holding means 106 such as the status of a particular blank storage locations and thereby controls the operation not only of the holding means 106 but also of the conveying means 104 as well as the blank cutting device 100. In particular, when the holding means 106 is filled to capacity, the blank cutting device 100 is instructed to temporarily discontinue cutting of additional blanks. This may be accomplished with a known blank cutting or slitting device by stopping the vacuum. The conveying means 104 may be instructed to cease operation as well, particularly when the conveyor is synchronized with the cutter. Likewise, when the holding means 106 has available storage locations as determined by the control means 114 seeking an empty location, the blank cutting device 100 is instructed to once again begin cutting blanks for conveyance by the conveying means 104 to the holding means 106.

The second control means 116 receives information from the can forming device 110, and more particularly from an input thereof to determine the condition of an input hopper. When the input hopper of the can forming device 110 falls below a predetermined low level, the second control means 116 instructs the transfer means 108 to remove stored blanks from the holding means 106 and transfer them to the input hopper of the can forming device 110. The transfer means 108 continues to operate until the input hopper of the can forming device 110 reaches a predetermined maximum level at which time the control means 116 interrupts operation of the transfer means 108. When the operation of the transfer means 108 is interrupted, the holding means 106 accumulates blanks until filled, at which time the first control means 114 interrupts operation of the blank cutting device 100, as set forth above.

In an exemplary embodiment, each of the first and second control means 114 and 116 is a programmable logic controller, such as an Allen Bradley S.L.C. 150 controller. The controllers are linked in operation, as shown by line 118. It is also possible that instead of two individual control means, a single control may be provided. as shown schematically by the dashed connecting lines extending between the first and second control means 114 and 116. Thus, the present invention provides interactive control not only of the individual elements of the inventive device but also of the known devices at the input and output thereof.

With reference now to FIG. 2, a plan view of a two-step chain conveyor is shown which constitutes the conveying means 104 and lies substantially perpendicular to the output of the blank cutting device 100. The blank cutting device 100 of the preferred embodiment is a slitter which cuts can blanks from rolled sheet steel. In the illustrated embodiment, the can blanks are ejected into the conveying means 104 five wide, although other arrangements with greater or fewer blanks may also be provided depending upon, among other things, the size of the blanks. The conveyor 104 includes a plurality of sword members 120 extending from a far side support 122 toward the slitter 100. The sword members 120 lie below a forward edge of the can blanks as they are ejected from the slitter 100, as indicated in broken outline at B. The sword members 120, seven of which are included in the illustrated embodiment, are mounted above a first chain conveyor section formed by chains 124 and 126 mounted between the far side wall 122 and an opposite side wall 128. The chains 124 and 126 are driven either by a motor (not shown) or directly from an output drive 129 of the slitter 100 so that the conveyor operates synchronously therewith to carry the blanks B in the direction of arrow C.

The relationship between the sword members 120 and the chain conveyor section 126 and 124 can be seen more clearly in FIG. 3. Once the blanks B have left the slitter 100, the trailing edge, with reference to the arrow C, drops downwardly before the forward edge of the blank B so that the blanks are caused to fall at an angle. When the blanks B reach the conveyor 124 and 126, they are caught in L-shaped brackets 130 as shown in FIG. 3 and as shown in more detail in FIG. 4.

Once on the L-shaped brackets 130 of the first chain conveyor 126, the blanks B rest on a first arm 132 of the bracket 130 and abut a second arm 134 of the corresponding bracket 130. The forward edge of the blank B rests on the arm 134 of the preceeding L-shaped bracket 130. The spacing of the chains 124 and 126 is adjustable to accept blanks of different sizes.

A forward end 136 of the first conveyor section 124 and 126 is angled downwardly so that the raised forward edges of the blanks B are lowered and lie overlapping the trailing edge of the preceeding blank B. As the first conveyor section 124 and 126 is lowering the forward edges of the blanks B, it is also transferring the blanks B to a second chain conveyor section including the chains 138 and 140. In place of the L-shaped brackets 130, the second conveyor section 138 and 140 includes small fingers 142 projecting upwardly from spaced chain links as shown in FIG. 5. The second chain conveyor section 138 and 140 also carries the blanks B in the direction C to the end of the conveyor unit 104 where a plurality of accelerator rollers 144 are mounted. The accelerator rollers 144 are driven through an accelerator drive means 146 including a chain to engage the blanks B and forcefully eject the blanks B from the end of the conveyor 104.

In FIG. 6 is shown an example of an accelerator roller 144 including a pair of set screws 145 securing it to a shaft. The roller 144 includes a groove in which rides a belt 147 connecting to other accelerator rollers. A brush 148 is mounted over the second conveyor section 138 and 140 to contact the blanks B and ensure their contact with the spaced fingers 142.

With reference now to FIG. 7, the conveyor 104 feeds the holding means 106 which, in the preferred embodiment, is a dial indexer or turntable having a plurality of blank storing locations 150. In the illustrated embodiment, six such stack storing locations are provided on a circular turntable 106 which is mounted for indexed rotation in the direction of the arrow R to place each of the stack receiving locations 150 consecutively at the output end of the conveyor 104. Greater or fewer number of blank storing locations 150 may be placed on the turntable depending upon the size of the blanks B. In the illustration of FIG. 7, a stack holding location shown at 152 receives the individual blanks B from the output of the conveyor 104 and forms them into stacks, as will be discussed in greater detail hereinafter. As the dial indexer or turntable 106 is rotated, the stack holding locations 150 reach a transfer position 154 where the stack is engaged and moved by the transfer means 108. Alignment bushings 156 are included at either end of the transfer position 154 for alignment with the transfer means 108. The transfer means 108 is shown in FIG. 7 disposed above the turntable 106 and, briefly, includes an overhead beam or gantry 160 supported by a first cross bar support 162 with legs 163 at one end and a further support 164 with a leg 166 spaced from the one end. The opposite end of the beam 160 is cantilevered to extend above the hopper of the can forming and welding device 110 (not shown in FIG. 7).

In FIGS. 8, 9 and 10 is shown one of the stack holding locations 150 mounted on the turntable or dial indexer 106. A portion of a second stack receiving position 150 can be seen in FIG. 8. Each stack receiving position 150 is formed by a plate or dial fixture 170 mounted by bolts 172 to the turntable 106. Along opposite sides of the plate 170 are mounted three upright members 174 which are spaced apart the width of the blank B as shown in broken outline. The uprights 174 thus form a pocket into which the blanks are thrown and in which the blanks B are held. At the end of the blank B closest to the center of the turntable is a selectively movable peg 176 against which one end of the blanks B abut. The peg 176 is movable to a plurality of different positions along the plate 170 depending upon the size of the blank being handled. The opposite end of the blank B overhangs somewhat the end of the plate 170 for engagement by an oscillating alignment means, which will be discussed hereinafter.

The center most end of the plate 170 includes an alignment sleeve or collar 178 in registration with an opening through the plate 170 and the turntable 106 forming one of the alignment locations 156 so that an alignment pin (not shown) can pass therethrough. An adjusting screw 180 is included for adjusting the position of the collar 178.

In FIG. 10, the uprights 174 can be seen extending above the plate 170 to form a pocket into which the blanks are thrown by the conveyor The top surfaces of the uprights 174 are flat in the illustrated embodiment. To prevent blanks from hanging up on the uprights 174, the top surfaces may be notched or otherwise shaped to receive the blanks. Likewise, it may be expedient to provide an angled or beveled surface at the top of the peg 176, as shown schematically at 182 in FIG. 9.

Referring to FIG. 11a, an oscillating alignment means 190. The alignment means 190 includes a preferably tapered face plate 192 for abuting an end of a stack of blanks B on the plate 170 which, in turn, is on the turntable 106. The face plate 192 is mounted on a front plate 194 which is connected by a pair of sliders 196 extending through a slide block 198 to a rear plate 200. A compression spring 202 biases the plate and slider assembly to the right relative to FIG. 11a so that the face plate 192 moves out of contact with the stack of blanks B. The plate and slider assembly is driven in a leftward direction relative to FIG. 11a by a cam 204 and roller 206 so that the face plate 192 comes into intermittent contact with the end of the stack of blanks B. The cam 204 is driven by a motor (not shown) as is known. The motor, slider assembly and slider block 198 are mounted on a slidable plate 208 which moves linearly relative to a base plate 210 by the action of a pnumatic cylinder 212. A proximity sensor 214 senses the relative position of the sliding plate 208.

Referring to FIG. 11b, the face plate 192 can be seen mounted on a pair of the sliders 196 in the slide block 198 for movement by the cam 204. A drive motor 216 for the cam is also shown. The entire oscillating assembly is mounted on a mounting plate 218 which is stationarily mounted.

In operation, the oscillating alignment means 190 intermittently abuts the end of the stack of blanks B to assure that each blank is properly aligned as it falls into place. In a preferred embodiment, the cam 204 is driven synchronously with an output of the conveyor 104 and may include the possibility of a drive linkage thereto. The pnumatic cylinder 212 moves the oscillating face plate 192 away from the end of the stacked blanks B just prior to rotation of the turntable 106. Thereafter, the oscillating face plate 192 is moved back into place by the pnumatic cylinder 212. As a modification of the face plate 192, a beveled or arcuate surface may be provided.

In FIG. 12 is shown schematically a transfer operation from the dial indexer or turntable 106 to an input hopper of a can forming machine 110. The dial indexer or turntable 106 is mounted on a base 250 which includes an indexer motor 252 operable, for example, by the logic means 114 shown in FIG. 1. On the turntable 106 at the position 154 is a stack receiving plate 170 containing a stack S of blanks accumulated thereon. When needed, the stack S is moved vertically to a transfer height at a position 254 and then transferred horizontally to a position 256 over a hopper 258 of the can forming device 110. The stack S is then lowered in alignment with the stack in the hopper 258 and deposited. Individual stacks are thus, moved from the turntable 106 to virtually any location within a can making plant for depositing into the welder hopper 258. The horizontal and vertical transfer distances are adapted to fit the particular plant arrangement and preferably the vertical transfer height provides walk-through clearance for the operator of the welder and/or clearance for moving machinery and supplies. By providing the stacks S on a rotatable turntable, the relative angle of a conveyor 104 to the transfer means 108 can be adapted to fit the particular plant layout as well.

Figure 13:
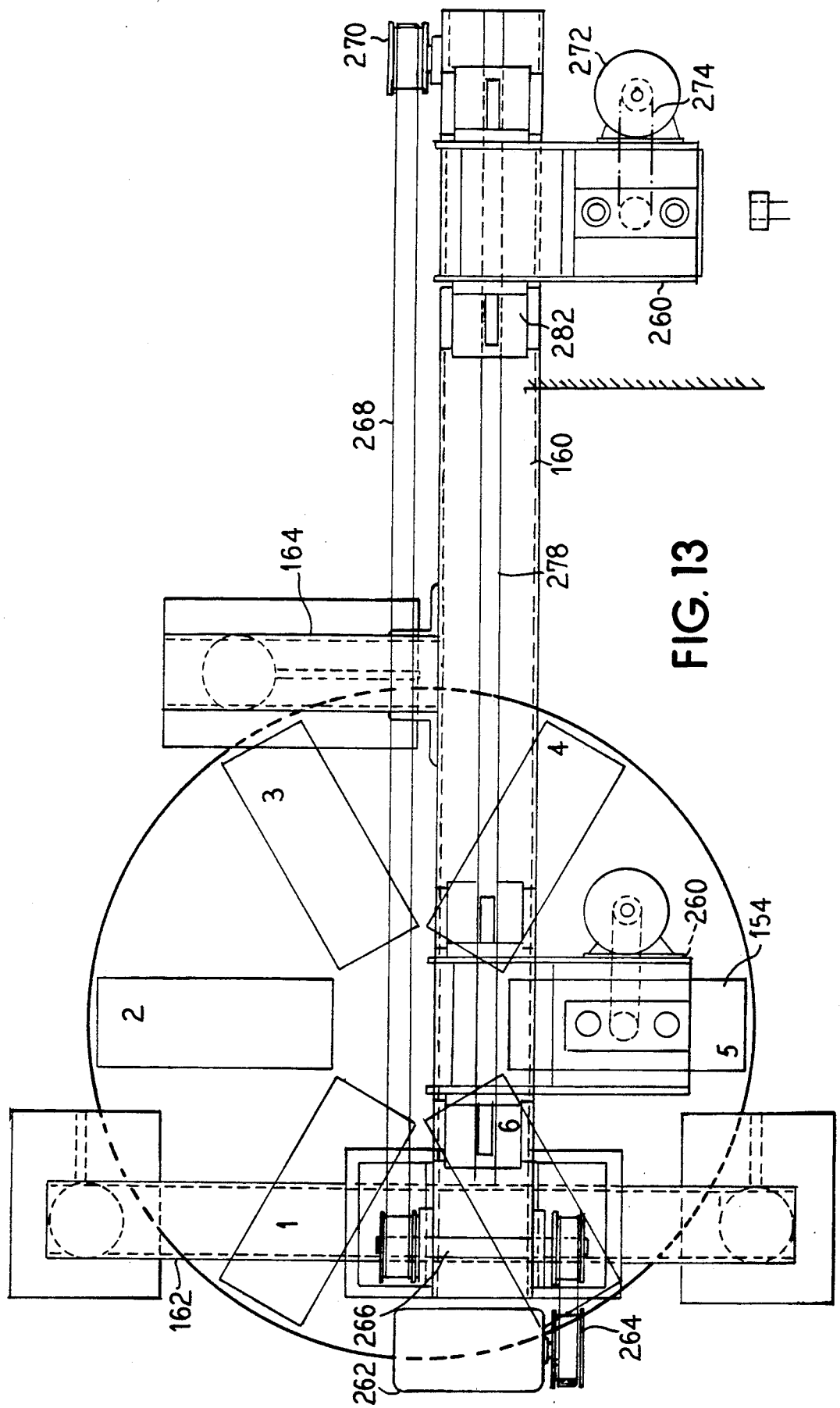
FIG. 13 is a plan view of the transfer gantry of the invention shown mounted over the turntable.

A preferred embodiment of the transfer means 108 is shown in greater detail hereinafter including, in FIG. 13, the beam or gantry 160 with the cross bar support 162 and additional support 164 which provides a three point cantilevered support for the end of the beam 160. Mounted for movement along beam is a carriage assembly 260 which moves between a first position shown in phantom over the transfer position 154 to a second position shown in solid outline overlying the welder hopper 258. Horizontal movement of the carriage assembly 260 is controlled by a motor 262 through a first belt and pulley assembly 264 which drives an axil 266 carrying an elongated belt 268 which runs substantially the length of the beam 160. A pulley 170 is provided at the far end of the beam 160.

The motor 162 is reversible to move the carriage assembly 260 between the first and second positions, the motor 262 being controlled by the control means 116 shown in FIG. 1. The carriage assembly 260 also has a motor 272 with a belt and pulley assembly 274 connected for vertical drive of a gripper assembly, as will be described hereinafter.

Figure 14:
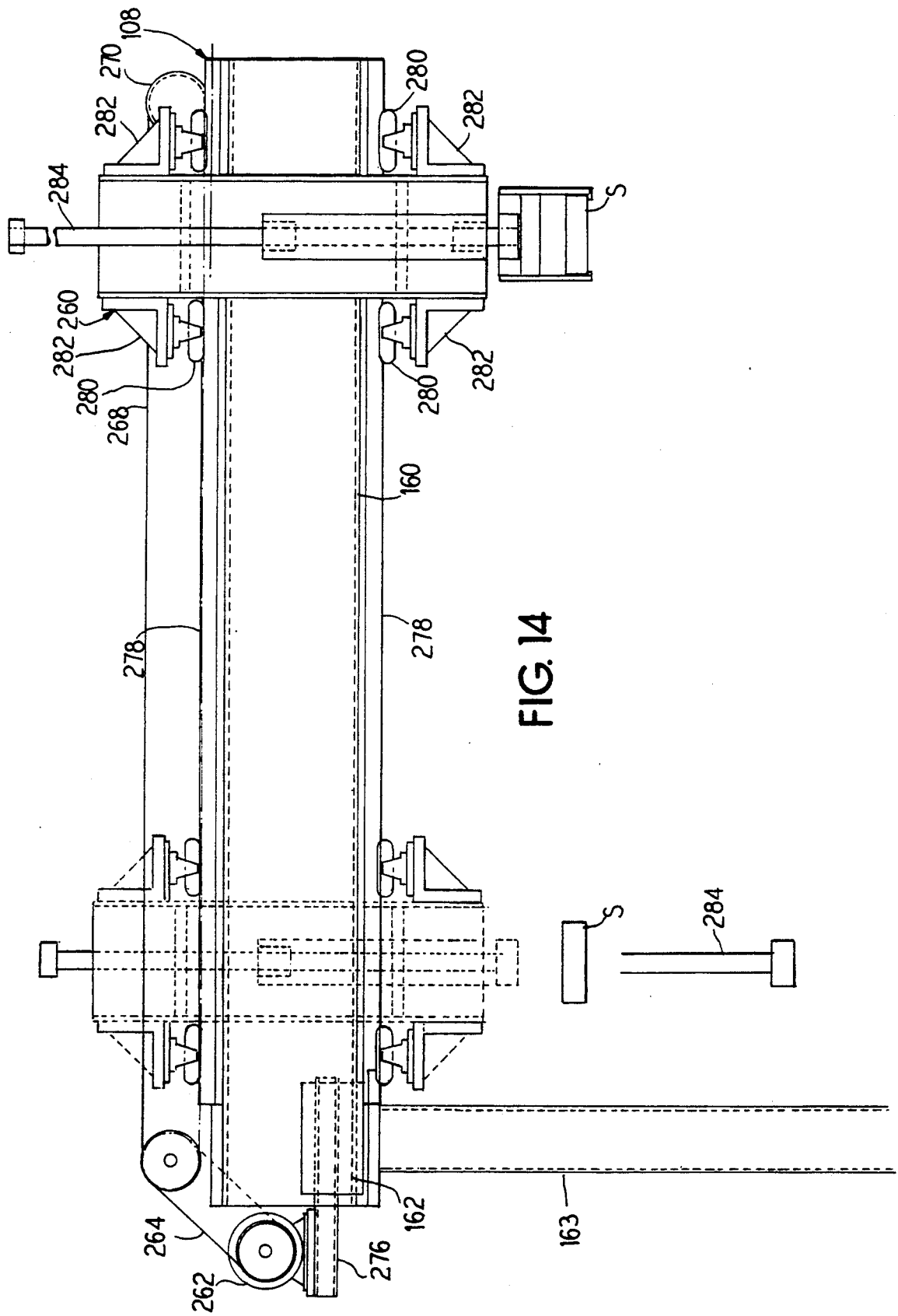
FIG. 14 is a side elevational view of the transfer gantry of FIG. 13.

A side view of the transfer means 108 in FIG. 14 shows the motor 262 mounted on a bracket 276 at the end of the beam 160. The beam 160 has a pair of rails 278 extending substantially the length thereof on which the carriage assembly 260 rides by way of bearings 280 mounted on brackets 282.

Within the carriage assembly 260, is mounted a set of vertically extending rods 284 at the lower end of which is attached a gripper, as will be described hereinafter. The rods 284 are movable vertically by means of the motor 272 and belt and pulley arrangement 274 shown in FIG. 13. Also in FIG. 14 can be seen one of the vertical support legs 163 which is connected to the cross bar member 162.

Figure 15:
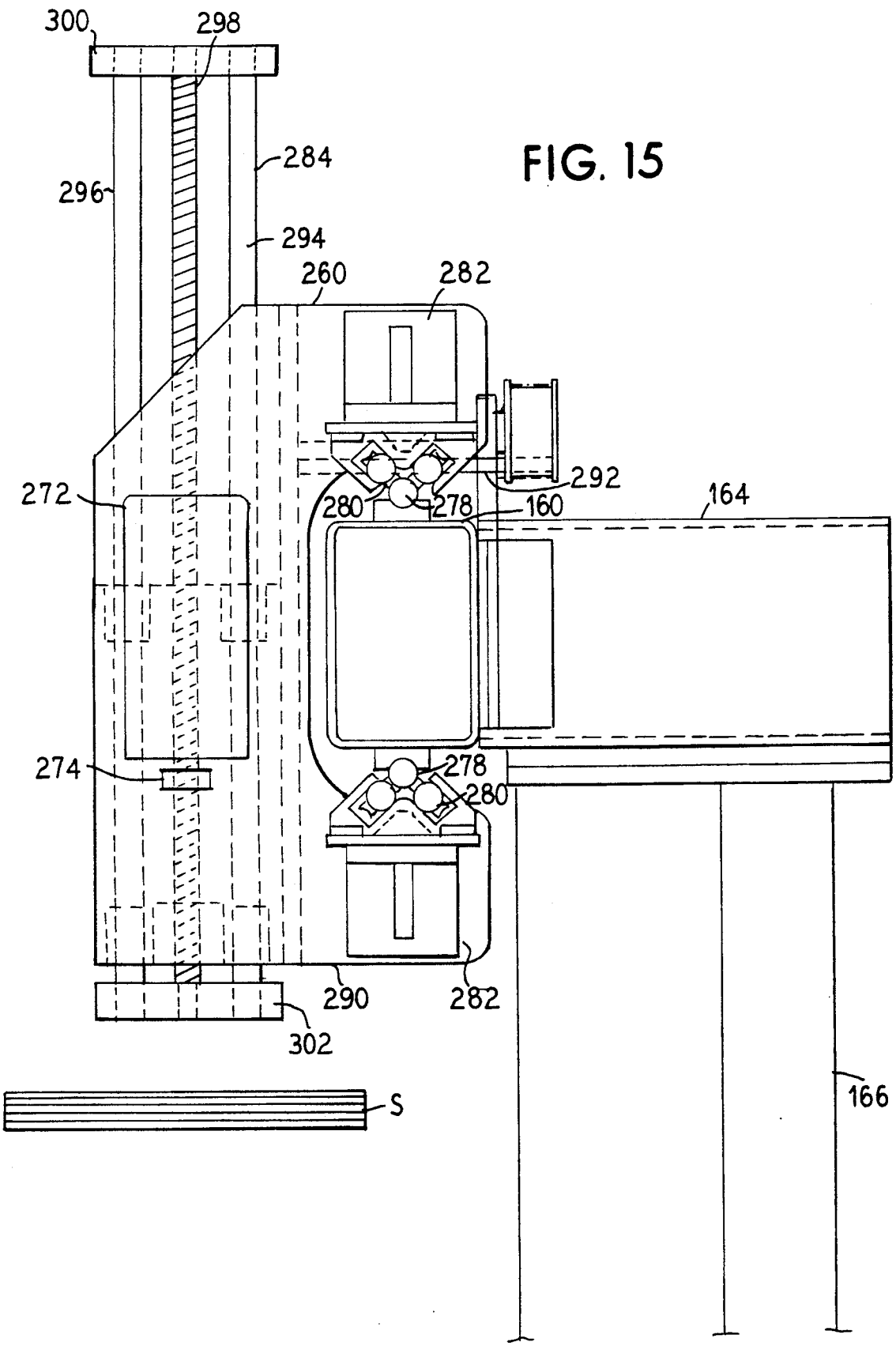
FIG. 15 is an end elevational view of the transfer gantry and a carriage assembly of FIGS. 13 and 14.

FIG. 15 is an end view along the beam 160 showing the support member 164 and support leg 166 and the carriage assembly 260 which has a C-shaped frame 290 extending both above and below the beam 160 so that the brackets 282 in which the bearings 280 are mounted can engage the rails 278. In the illustrated embodiment, the rails 278 are rods and the bearings 280, for example, Thompson round way bearings which lie at 45 and 135 degrees to horizontal. A belt engaging bracket 292 connects the carriage assembly 260 to the belt so that operation of the motor 262 are shown in FIGS. 13 and 14 can drive the carriage assembly 260 along the beam 160. As can be seen in FIG. 15, the rod group 284 includes three vertically extending rods, comprising a pair of outside rods 294 and 296 and a center threaded rod 298 which is connected to a threaded ball screw driven by the vertical drive motor 272 via the belt and pulley assembly 274. End plates 300 and 302 are provided at the top and bottom, respectively, of the rod group 284.

Figure 17:
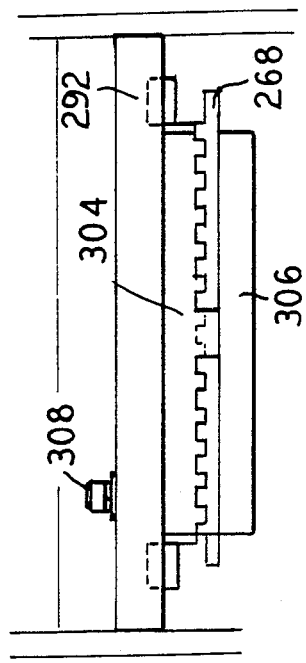
FIG. 17 is a side elevational view of the belt gripper device of FIG. 16.
Figure 16:
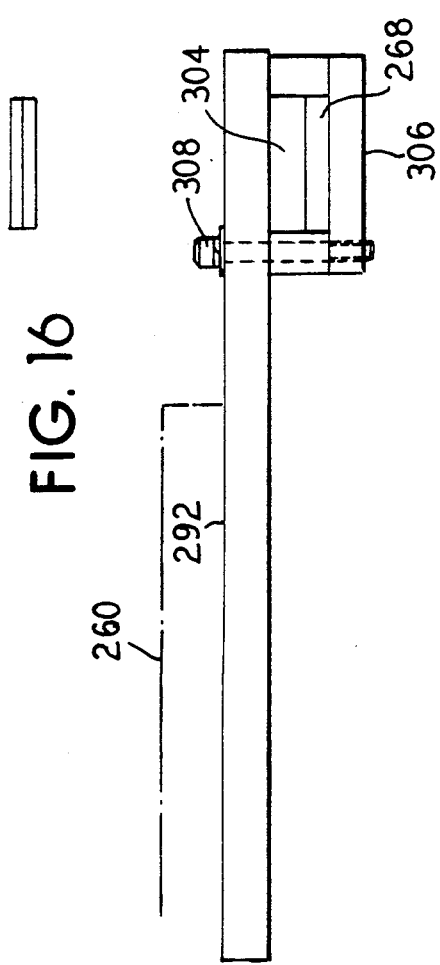
FIG. 16 is a side elevational view of a belt gripper for the carriage assembly of the present invention.

In FIGS. 16 and 17 is shown the belt gripper 292 which extends between the carriage assembly 260 and the elongated horizontal drive belt 268 to enable the carriage assembly 260 to move with the belt 268. The belt 268 is preferably a timing belt having a toothed inner surface. A toothed plate 304 engages the teeth of the timing belt 268 and the timing belt is held thereagainst by a clamp plate 306 held by a bolt 308. Not only does this securely retain the belt clamping device 292 at a predetermined location along the timing belt 268, but it also holds both of the free ends of the timing belt 268 as illustrated so that an endless belt is formed. A further advantage of this arrangement is that adjustment of the tension in the timing belt 268 can easily be made by releasing the clamping bolt 308 and moving one or both of the free ends before refastening the clamping bolt 308.

Figure 18:
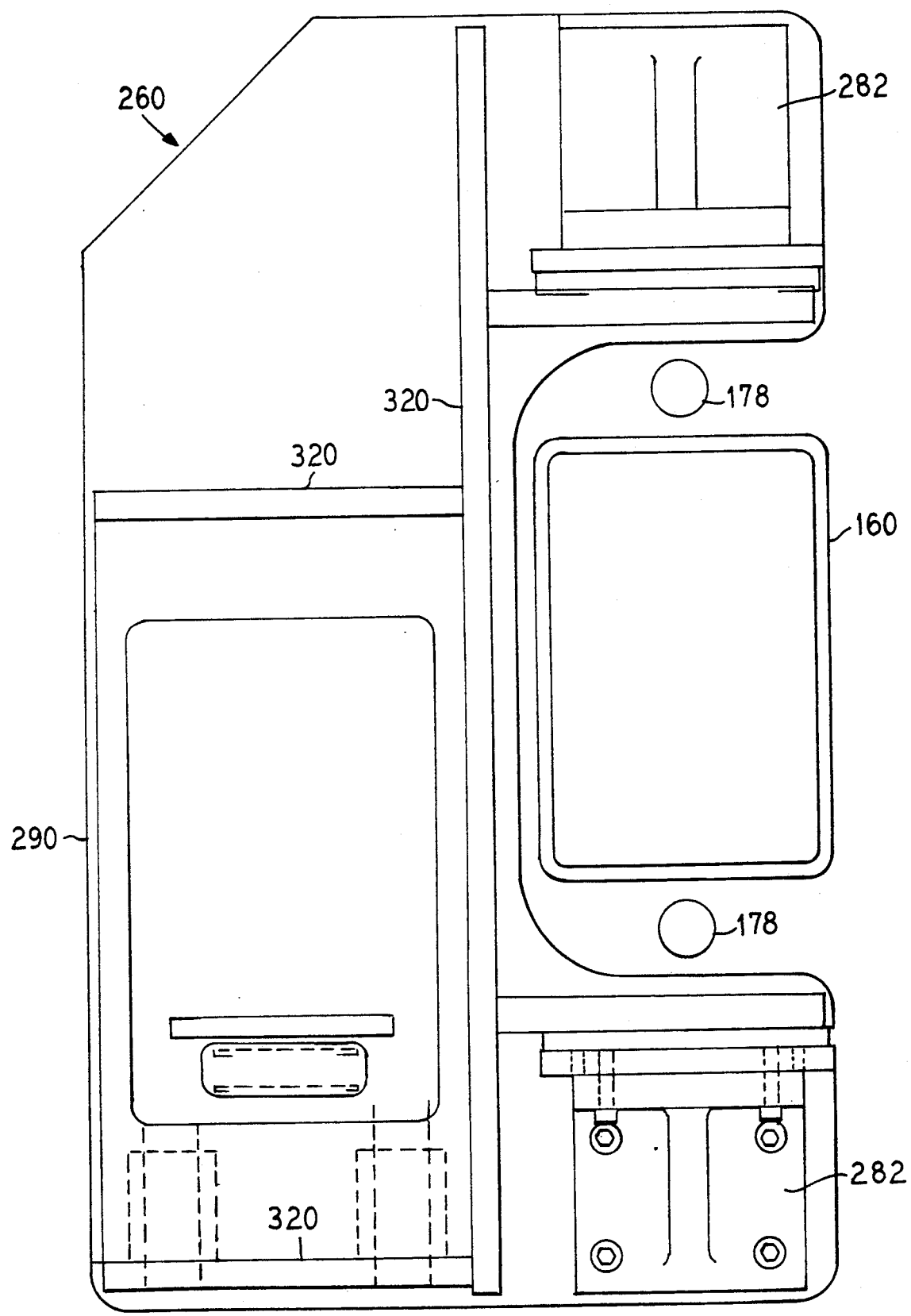
FIG. 18 is a side elevational view of the carriage assembly showing the internal support structure.
Figure 19:
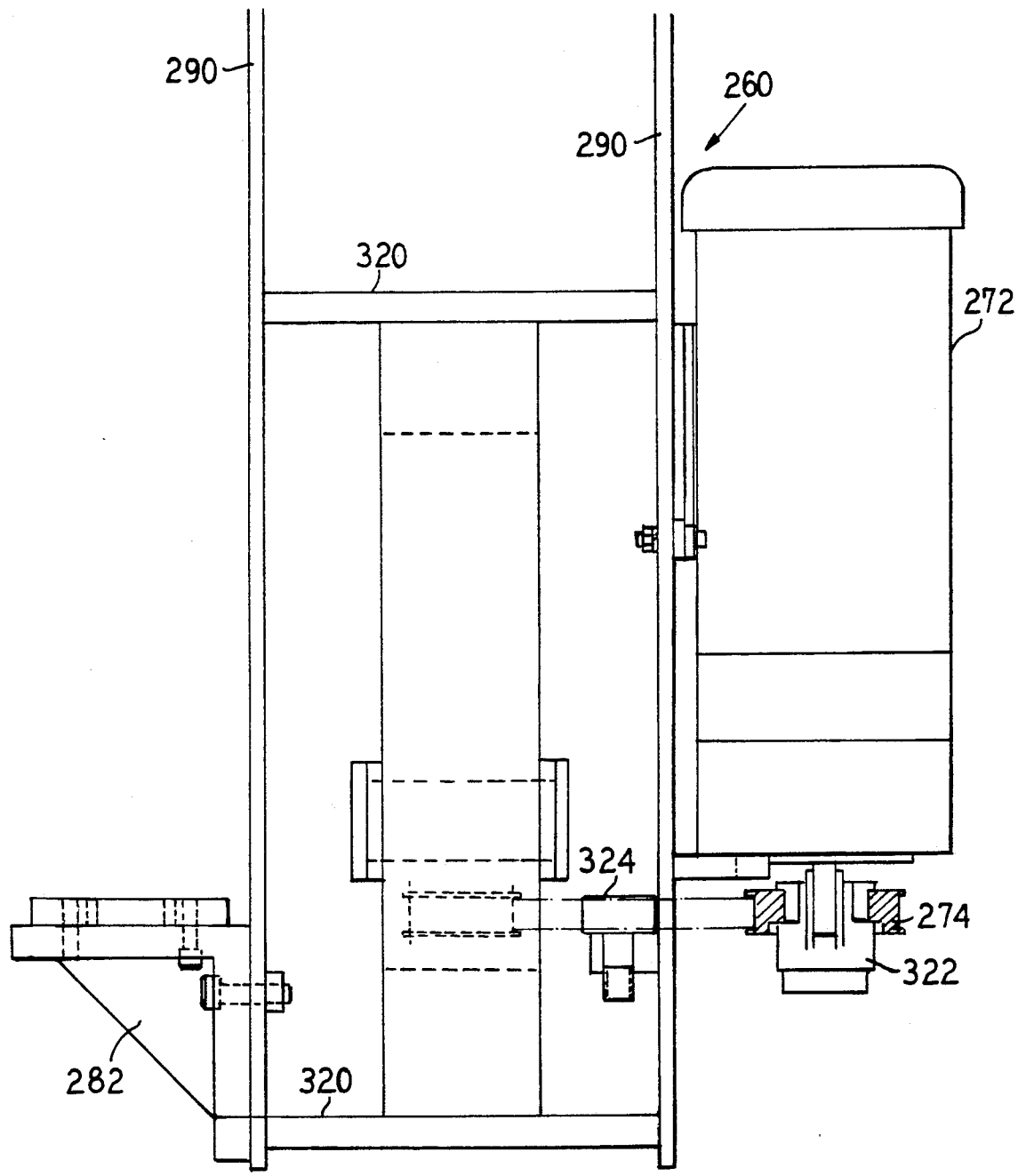
FIG. 19 is an end elevational view of the carriage assembly of FIG. 18 showing the mounting of the vertical drive motor.

Further details of the carriage assembly 208 are shown in FIG. 18 including the C-shaped housing plates 290 on which the brackets 282 are supported. In more detail, and with reference to both FIGS. 18 and 19, the brackets 282 are bolted directly to the two spaced C-shaped plates 290. Between the spaced C-shaped plates 290, an assortment of plates 320 form a frame for the carriage assembly 260. The frame supports, among other things, a vertical drive assembly. The vertical drive assembly is driven by the vertical drive motor 272 through the pulley and belt combination 274 which includes, in the embodiment shown in FIG. 19, a clutch brake assembly 322. An tension pulley 324 is also provided in the carriage assembly 260 which is adjustable to vary the tension in the belt and pulley 274.

Figure 20:
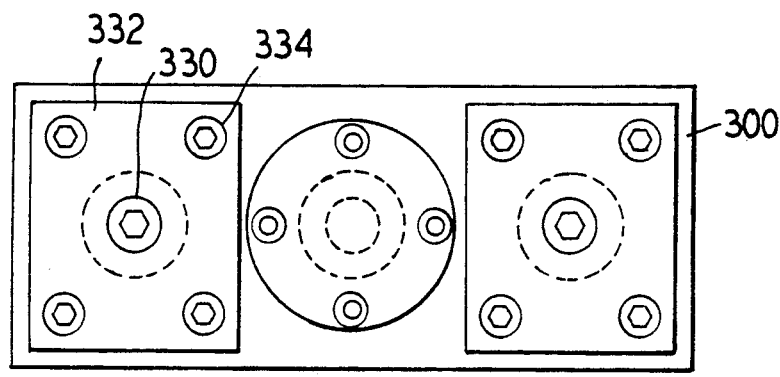
FIG. 20 is a plan view of an end plate for vertical drive rods of the invention.
Figure 21:
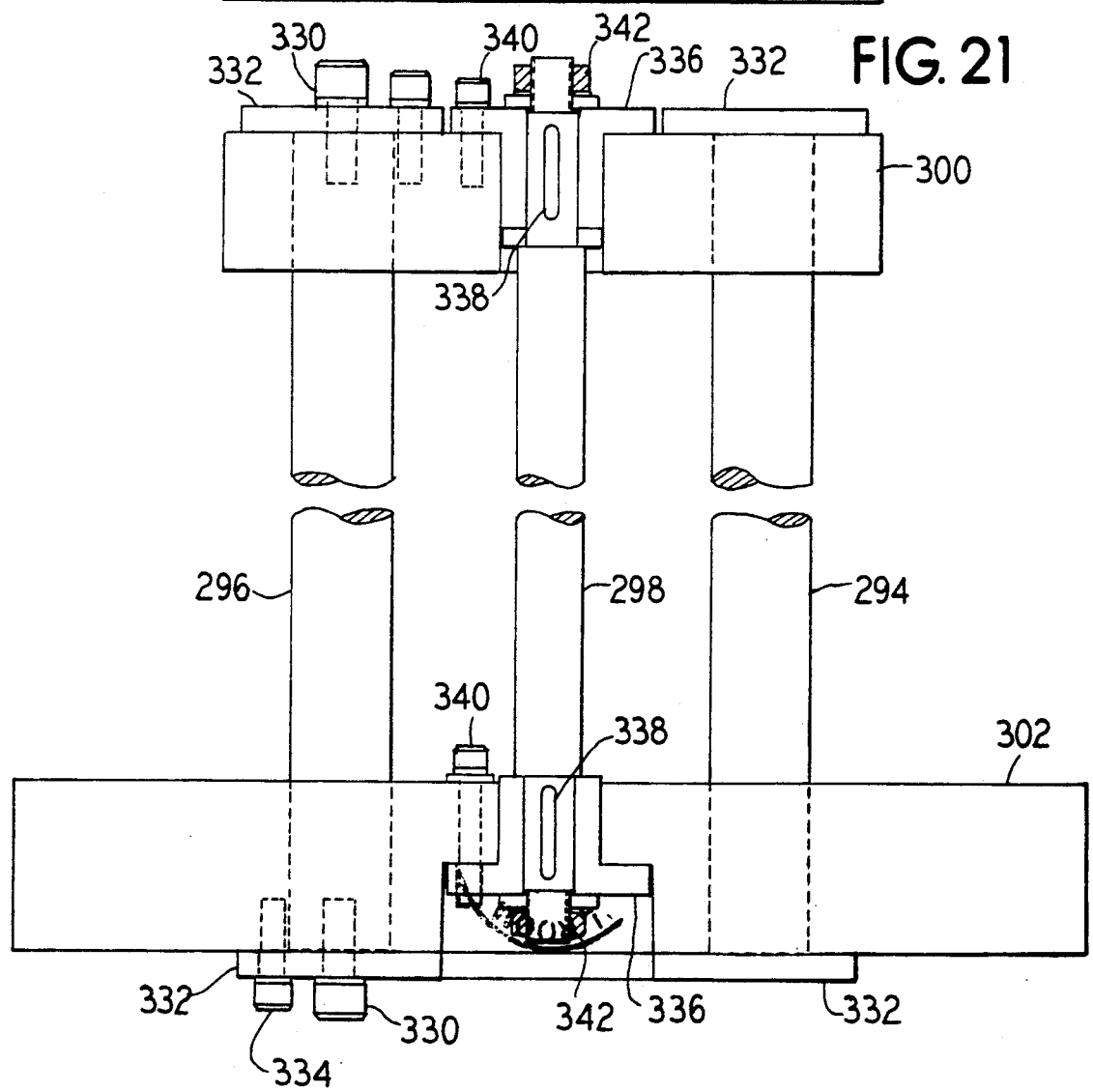
FIG. 21 is a side elevational view of the vertical drive rods according to the present invention including the end plate shown in FIG. 20.

Further details of the vertical drive assembly include, in FIGS. 20 and 21, the rod group 284 with the outside slider rods 294 and 296 and the threaded center rod 298 connected between the plates 300 and 302. The slider rods 294 and 296 each include threaded bores at their opposite ends into which are threaded bolts 330. The bolts 330 are held in mounts 332 which are mounted to the respective plates 300 and 302 by additional bolts 334. A different arrangement is provided for the center threaded shaft 298 since it undergoes rotational torque. Instead of the mounts 332, a collar 336 is mounted over a reduced diameter section at each end of the threaded rod 298 and is prevented from rotating by a key 338 mounted in a key way. Bolts 340 extend into the corresponding plates from the collar to fix the collars 336 against relative rotation. A lock nut 342 is provided on each threaded end of the rod 298.

Figure 22:
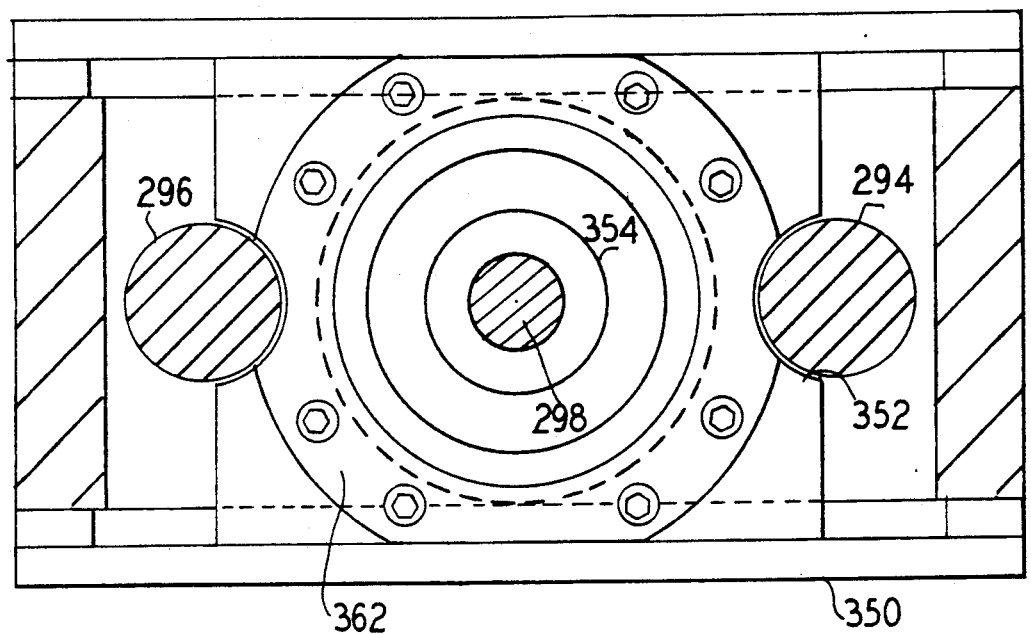
FIG. 22 is a plan view of a box for a vertical drive assembly of the present invention.
Figure 23:
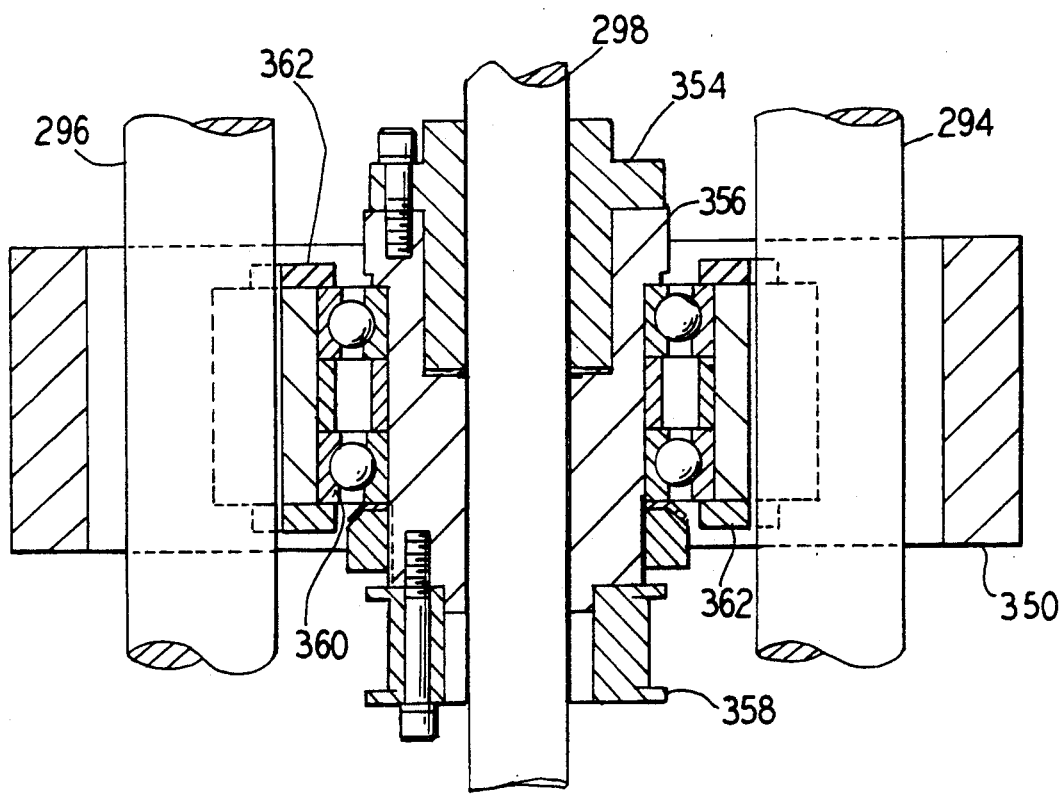
FIG. 23 is a vertical cross section through the vertical drive assembly of FIG. 22.

Providing an operative connection between the vertical drive motor 272 and the vertical rod group 284 is an arrangement as shown in FIGS. 22 and 23. The illustrated arrangement is mounted in the carriage assembly 260 and includes a vertical drive housing 350 having clearances 352 to permit the vertical rod members 294 and 296 to slide therethrough. On the threaded shaft 298, an internally threaded sleeve 354 is mounted carried in a secondary ball sleeve 356 which is rotatably driven by a pulley 358 through the belt and pulley arrangement 274 of the vertical drive motor 272. The secondary sleeve 356 is mounted in rotational bearings 360 which in turn are held in the vertical drive housing 350 by annular bearing clamps 362. Thus, by rotation of the threaded ball sleeve 354 through the pulley 358, the threaded shaft 298 is cause to move vertically in the corresponding direction.

In FIGS. 24 and 25 is shown a shot pin assembly 370 by which an exact horizontal position of the carriage assembly 260 can be determined and maintained. The shot pin assembly is mounted by a mounting plate 372 on the beam 160, the mounting plate 372 carrying a pnumatic cylinder 374 which is operable to move vertically a shot pin slide 376 carrying a shot pin 378. The slide 376 includes a head 379 which has enough weight to force the shot pin 378 into a down position when the pneumatic cylinder 374 is off. Mounted on the carriage assembly 260 is at least one C-shaped bushing 380 having spaced arms between which the shot pin 378 is received when the carriage 260 is in a predetermined horizontal position. Two such shot pin assemblies are preferably provided on the beam 160 at the first and second positions. When two bushings 380 are on the carriage 260 alignment at each position is made easier.

A second embodiment including a vertically disposed horizontal drive motor 390 with a transmission 392 is shown in FIGS. 26 and 27 for use in some installations. The horizontal drive belt 268 and other features remain the same in this embodiment. In FIG. 27 can be seen the preferred mounting brackets 294 for the pulleys 264 and axil 166. A mounting bracket 296 in FIG. 28 holds the pulley 270 to the beam 160.

In FIGS. 29, 30 and 31 are shown a pnumatic gripper assembly for mounting on the plate 302 of the vertical drive assembly. A mirror image is assumed in the Figures, only one side being shown for the sake of simplicity. The gripper includes a pair of oppositely disposed gripper brackets 400 along the bottom edge of which are mounted gripper fingers 402. The gripper brackets 400 are pivotable about pivot pins 404 by the action of a pnumatic cylinder 406 to operate as a bell crank and are thereby pivotable inwardly and outwardly to engage and disengage the stacks of can blanks. Pivoting by only a few degrees is required. The pneumatic cylinder 406 pulls downwardly on a shaft 408 that is upwardly biased by a compression spring 10. A cam 412 in cam slots 414 causes the inward leg of each bracket to pivot downward and thereby move each set of fingers 402 outward. When the pnuematic cylinder 406 is released or is off, the spring 410 holds the gripper closed to prevent dropping of the stack S.

To detect the top of the hopper stack H of the welder, an optical sensor pair 416 is mounted on the gripper. When the gripper approaches and senses the hopper stack H, it slows its downward motion and releases the stack S so that a predetermined release height above the hopper stack is always maintained.

Proper alignment with the hopper stack H and with the transfer position 154 on the turntable 106 is important so the gripper includes a pair of vertically oriented alignment pins 420 which fit into the collar 178 on the turntable when picking up a stack S and likewise fit into a similar pair of bushings 422 on the welder hopper to ensure proper alignment therewith.

In addition to the illustrated parts, the present apparatus of course includes the necessary electrical and pnumatic connections to provide the disclosed operation. Additionally, numerous proximity switches and optical switches are mounted to determine, among other things, when the turntable is in one of the stack receiving positions, when the oscillating stack pusher is in retracted position as well as the extended position, when the vertical drive assembly has reached its upper and lower points, when the gripper jaws are opened and when closed, when the shot pins are engaged, when the welder hopper is low, when the welder hopper is full, and when the turntable is full.

According to the process of the present invention, the system is placed into a "home" position where the table is in dwell with a stack receiving position or pocket at the end of the conveyor, the stack pusher or reciprocator in the extended position, the vertical drive assembly in the up position, the horizontal drive assembly positioned over the pickup position and the pickup shot pin extended.

When the system is operating with the welder hopper full sensor operated, the conveyor fills the number 1 stack position on the turntable and turns the slitter vacuum off, after which the stack pusher retracts and the turntable is indexed to the next empty position. When the position no. 1 is empty, the slitter vacuum is turned back on and the table position at position 1 begins receiving blanks once more.

When the welder hopper sensor is not operated and no blanks are available at the turntable pickup position, the turntable receiving position is filled and the splitter vacuum turned off, after which the stack pusher retracts. The table then indexes to the next empty position and if a full stack receiving position is at the pickup position, the turntable will stop and the vertical drive lowers the gripper to the table, closes the jaws and raises the stack from the table. The turntable again indexes in search of an empty position no. 1. In the meantime, the horizontal drive moves the carriage to the unload position after which the vertical drive lowers the stack to the welder hopper. The vertical drive ceases when the photo sensor 416 is interrupted to sense the top of the stack. The gripper jaws open and drop the stack onto the welder hopper after which the vertical drive raises the gripper from the unloading area and the horizontal drive returns the carriage to the pickup area for another stack.

When the welder hopper low switch is not operated, the slitter vacuum is turned off and the turntable is indexed until the pickup position has a stack of blanks. The above transfer procedure then occurs. If there are no stacks at the pickup position after five successive indexes, the system shuts down and a fault light is illuminated. The welder is then automatically turned off by the control means 116.

Thus, there is provided an apparatus and method for handling can blanks and the like wherein the blanks are received from a slitter, conveyed partially overlapping, projected into a receiving pocket of a stacker mechanism, held until needed, and then transferred accurately into a hopper of a welder. Among the numerous advantages provided by the present invention are greater flexibility, ease of setup and changeover for different size can blanks, ease of access to equipment, lower costs and less complexity than the known devices.

Although other modifications and changes may be suggested by those skilled in the art, it is the intention of the inventors to embody within the patent warranted hereon all changes and modifications as reasonably and properly come within the scope of their contribution to the art.

We claim:

1. A can blank transfer apparatus for transporting a variety of different sized can blanks from a blank slitter to a can forming device, comprising:

a conveyor arranged to simultaneously receive a plurality of can blanks of a first size fed in parallel to one another from an output of the blank slitter, said conveyor being adjustable to receive can blanks of at least a second different size and to receive a different number of parallel fed can blanks, said conveyor including an output from which can blanks are fed serially;

means for receiving serially fed can blanks from said output of said conveyor, said receiving means being operable to form aligned stacks of the can blanks of the first size, said means for receiving being adjustable to receive said can blanks of said at least a second different size;

means for transporting the aligned stacks of the can blanks of the first size from said receiving means to the can forming device, said means for transporting being adjustable to transport stacks of said at least a second different size can blanks; and means for depositing the aligned stacks into a hopper on the can forming device, said depositing means including means for sensing a vertical position of a top can blank in the hopper of the can forming device from a plurality of possible positions, and means for placing the aligned stacks at a predetermined aligned position, the predetermined aligned position being not greater than a predetermined vertical distance from the top can blank in the hopper of the can forming device.

2. A can blank transfer apparatus for transporting a variety of different sized can blanks from a blank slitter to a can forming device, comprising:

a conveyor arranged to simultaneously receive a plurality of can blanks of a first size fed in parallel to one another from an output of the blank slitter, said conveyor being adjustable to receive can blanks of at least a second different size and to receive a different number of parallel fed can blanks, said conveyor including an output from which can blanks are fed serially;

means for receiving serially fed can blanks from said output of said conveyor, said receiving means being operable to form aligned stacks of the can blanks of the first size, and means for receiving being adjustable to receive said can blanks of said at least a second different size;

means for transporting the aligned stacks of the can blanks of the first size from said receiving means to the can forming device, said means for transporting being adjustable to transport stacks of said at least a second different size can blanks;

means for depositing the aligned stacks into a hopper on the can forming device;

a first sensor mounted for sensing a height of the can blanks stacked in the hopper of the can forming apparatus, said first sensor providing a first indicator signal for controlling operation of said depositing means and said transporting means; and a second sensor mounted on the means for depositing for sensing a topmost can blank in the hopper, said second sensor controlling release of aligned stacks by said means for depositing.

3. A can blank transfer apparatus as claimed in claim 2, further comprising:

a second sensor mounted for sensing the height of the can blanks in the hopper.

4. A can blank transfer apparatus for transporting a variety of different sized can blanks from a blank slitter to a can forming device, comprising:
- a conveyor arranged to simultaneously receive a plurality of can blanks of a first size fed in parallel to one another from an output of the blank slitter, said conveyor being adjustable to receive can blanks of at least a second different size and to receive a different number of parallel fed can blanks, said conveyor including an output from which can blanks are fed serially;
- means for receiving serially fed can blanks from said output of said conveyor, said receiving means being operable to form aligned stacks of the can blanks of the first size, said means for receiving being adjustable to receive said can blanks of said at least a second different size;
- means for transporting the aligned stacks of the can blanks of the first size from said receiving means to the can forming device, said means for transporting being adjustable to transport stacks of said at least a second different size can blanks, said means for transporting includes:
  - a transfer gantry with means for selectively gripping the aligned stack of can blanks in a substantially vertical position, said transfer gantry includes a substantially horizontal rail and a carriage carried on said rail for horizontal movement,
  - means for selectively vertically moving said gripping means, said means for vertically moving includes a substantially vertically extending arm connected to said gripping means and movably mounted in said carriage, a motor being operable to move said vertically extending arm relative to said carriage, and
  - means for selectively horizontally moving said gripping means while maintaining the aligned stack of can blanks in a substantially vertical position, said means for horizontally moving including a first drive motor selectively operable to move said carriage along said rail; and
- means for depositing the aligned stacks into a hopper on the can forming device;
- at least one alignment pin extending downwardly from said gripping means, and
- an alignment sleeve at each of a plurality of receiving positions of said receiving means, said alignment sleeve defining an opening for accepting said alignment pin during gripping of a stack of can blanks by said gripping means.

5. A can blank transfer apparatus for transporting a variety of different sized can blanks from a blank slitter to a can forming device, comprising:
- a conveyor arranged to simultaneously receive a plurality of can blanks of a first size fed in parallel to one another from an output of the blank slitter, said conveyor being adjustable to receive can blanks of at least a second different size and to receive a different number of parallel fed can blanks, said conveyor including an output from which can blanks are fed serially;
- means for receiving serially fed can blanks from said output of said conveyor, said receiving means being operable to form aligned stacks of the can blanks of the first size, said means for receiving being adjustable to receive said can blanks of said at least a second different size;
- means for transporting the aligned stacks of the can blanks of the first size from said receiving means to the can forming device, said means for transporting being adjustable to transport stacks of said at least a second different size can blanks, said means for transporting includes: a transfer gantry with means for selectively gripping the aligned stack of can blanks in a substantially vertical position, said transfer gantry includes a substantially horizontal rail and a carriage carried on said rail for horizontal movement,
  - means for selectively vertically moving said gripping means, and
  - means for selectively horizontally moving said gripping means while maintaining the aligned stack of can blanks in a substantially vertical position, said means for horizontally moving including a first drive motor selectively operable to move said carriage along said rail; and
- means for depositing the aligned stacks into a hopper on the can forming device;
- a toothed timing belt driven by said first drive motor, and
- a toothed clamp on said timing belt and connected to said carriage.

6. A can blank transfer apparatus for feeding can blanks to a welder hopper, comprising:
- means for stacking can blanks into at least one aligned stack;
- a gantry beam mounted horizontally and having a first portion extending over said means for stacking and a second portion over the welder hopper;
- a carriage mounted on said gantry beam and movable between said first and second portions;
- a gripper suspended from said carriage and operable to selectively grip the aligned stacks;
- means for moving said gripper vertically relative to said carriage to lift the aligned stack and to alternately lower the aligned stack when gripped by said gripper;
- means for moving said carriage along said gantry beam between said first and second positions to transport the aligned stack from said means for stacking to the welder hopper; and
- sensor means on said gripper for accommodating changes in height of a topmost one of the can blanks in the welder hopper during release of the aligned stack by said gripper in said second position onto the can blanks in the welder hopper so that the aligned stack is released at no more than a predetermined height above the topmost one of the can blanks.

7. A can blank transfer device for transferring can blanks to an input hopper of a can welder, comprising:
- means for forming and temporarily storing aligned stacks of can blanks; and
- means for automatically positioning the aligned stacks into the input hopper as needed, said means for positioning automatically aligning the can blanks being positioned in the input hopper with can blanks already in the input hopper, said means for positioning releasing the can blanks in the input hopper at a vertical position corresponding to a position of a topmost can blank in the input hopper so that the can blanks are released at a position not greater than a predetermined height above the topmost can blank in the input hopper means for positioning comprises:

a generally horizontal gantry having a railing mounted extending over said aligned stacks in said means for forming and temporarily storing and over the input hopper of the can welder;

a carriage assembly mounted on said railing for movement between a first position above said aligned stacks in said means for forming and temporarily storing and a second position above the input hopper of the can welder;

means for moving said carriage assembly between said first and second positions;

a gripper means on said carriage assembly for gripping and holding aligned stacks of the can blanks;

means for moving said gripper means vertically relative to said carriage assembly;

means for sensing the presence of said carriage assembly in said second position over the input hopper of the can welder; and means for temporarily securing said carriage assembly in said second position.

8. A can blank transfer device as claimed in claim 7, wherein said means for positioning includes a sensor to sense a topmost one of the can blanks in the input hopper.

* * * * *